US006948730B2

United States Patent
Morita et al.

(10) Patent No.: US 6,948,730 B2
(45) Date of Patent: Sep. 27, 2005

(54) BICYCLE WITH SPEED CHANGE GEAR

(75) Inventors: Kenji Morita, Saitama (JP); Shinya Matsumoto, Saitama (JP); Naoki Inoue, Saitama (JP); Yoshiaki Tsukada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/252,948

(22) Filed: Sep. 24, 2002

(65) Prior Publication Data

US 2003/0080529 A1 May 1, 2003

(30) Foreign Application Priority Data

Sep. 25, 2001 (JP) ........................................ 2001-291298
May 31, 2002 (JP) ........................................ 2002-159334

(51) Int. Cl.[7] .............................................. B62M 1/02
(52) U.S. Cl. ....................................................... 280/260
(58) Field of Search ................................. 280/284, 288, 280/259, 260, 288.1, 257, 261, 281.1; 74/473.13, 473.14

(56) References Cited

U.S. PATENT DOCUMENTS

| 4,039,200 A | * | 8/1977 | McGonegle | 180/227 |
| 4,955,247 A | * | 9/1990 | Marshall | 74/347 |
| 5,522,612 A | * | 6/1996 | Considine | 280/260 |
| 5,577,749 A | * | 11/1996 | Ross | 280/261 |
| 5,667,233 A | * | 9/1997 | Metzinger | 280/238 |
| 5,904,362 A | * | 5/1999 | Yoo | 280/237 |
| 5,975,266 A | * | 11/1999 | Balhorn | 192/64 |
| 5,979,924 A | * | 11/1999 | D'Aluisio et al. | 280/261 |
| 5,983,751 A | * | 11/1999 | DeCloux | 74/594.2 |
| 6,029,990 A | * | 2/2000 | Busby | 280/261 |
| 6,079,726 A | * | 6/2000 | Busby | 280/261 |
| 6,585,278 B1 | * | 7/2003 | Cerqua et al. | 280/287 |

FOREIGN PATENT DOCUMENTS

JP   6-48368   2/1994

* cited by examiner

*Primary Examiner*—Avraham Lerner
(74) *Attorney, Agent, or Firm*—Birch, Stewart, Kolasch & Birch, LLP

(57) ABSTRACT

A speed change gear shaft for a bicycle having an internal speed change gear. The speed change gear is of the internal multistage type, and a speed change gear shaft is provided separately from a crankshaft of the bicycle. A swing arm on which a rear wheel is supported is supported for rocking motion on a main frame a rocking shaft. Since the speed change gear is disposed in the proximity of the rocking shaft, the fluttering of a chain can be suppressed small. Moreover, since the rocking shaft need not necessarily be disposed in the proximity of the crankshaft, the degree of freedom in design increases. Also, because the speed change gear shaft is disposed forward of the rocking shaft, the fluttering of the chain can be minimizer.

8 Claims, 20 Drawing Sheets

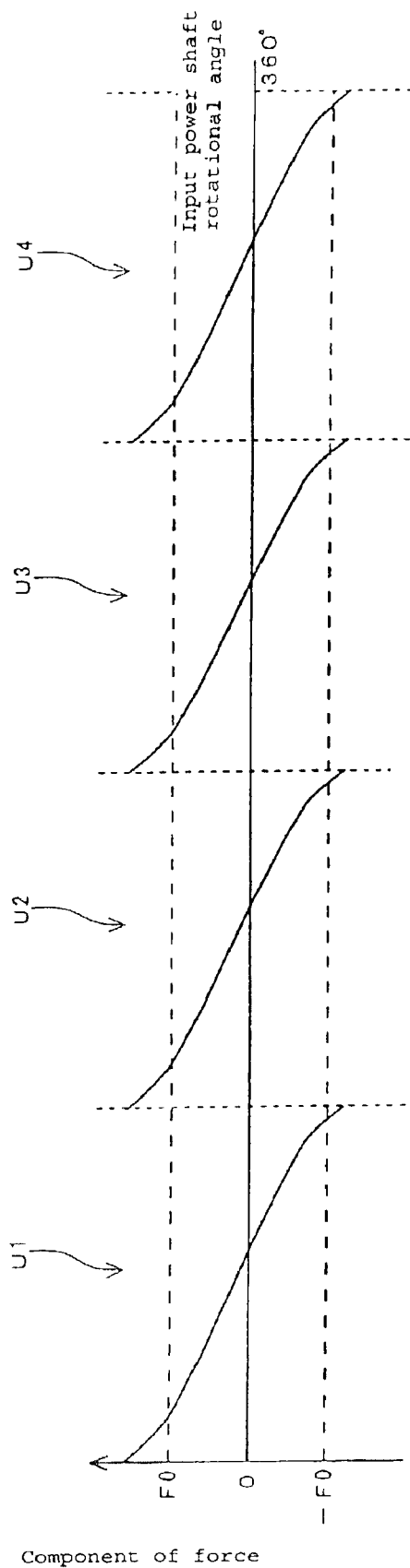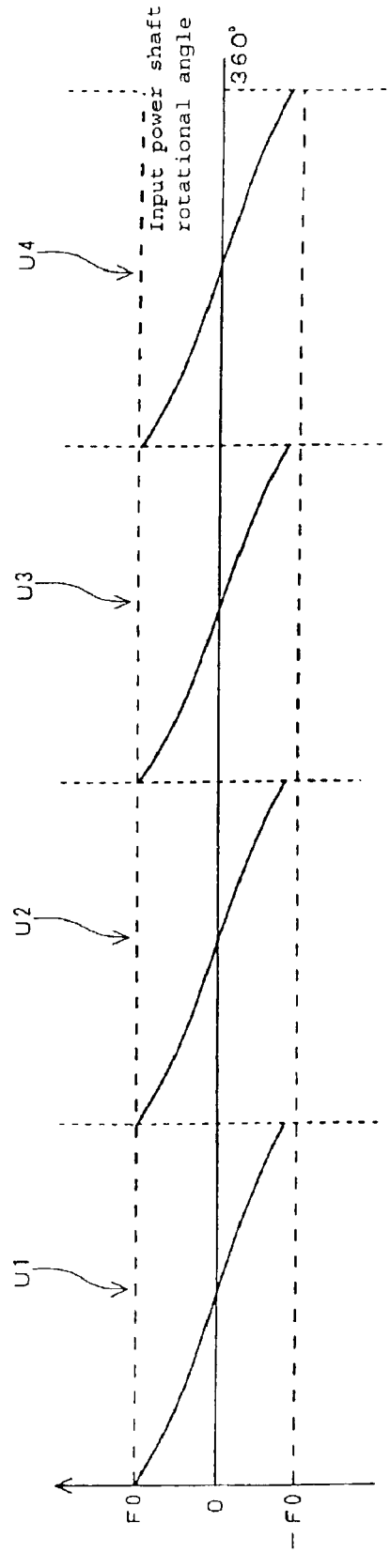
FIG. 20(a)
FIG. 20(b)

BICYCLE WITH SPEED CHANGE GEAR

CROSS-REFERENCE RELATED APPLICATION

The present application claims priority under 35 U.S.C. § 119 to Japanese Patent Application Nos. 2001-291298, filed Sep. 25, 2001, and 2002-159334, filed on May 31, 2002, the entire contents of which are hereby incorporated by reference.

BACKGROUND OF THE INVENTION

1. Field of the Invention

This invention relates to a bicycle with a speed change gear, and more particularly to a bicycle with a speed change gear suitable for increasing the degree of freedom of the design of a bicycle body frame.

2. Description of Background Art

A bicycle with a speed change gear which includes an internal speed change gear disposed coaxially with a crankshaft is known. For example, in a bicycle disclosed in the official gazette of Japanese Patent Laid-Open No. Hei 6-48368, a motor is connected to a changeover lever of a speed change gear disposed on a crankshaft such that the speed change gear is changed over by the motor.

The bicycle with a speed change gear described above has the following problems. First, since the outputting position of the speed change gear for transmitting treadling force to a rear wheel is limited to the position on the crankshaft or in the proximity of the crankshaft, the degree of freedom of the design of the bicycle body is limited. In this situation, a swing arm for supporting the rear wheel thereon is configured for rocking motion with respect to a main frame of the bicycle body, and a rocking shaft (swing arm pivot) and an output power shaft of the speed change gear (the output power shaft is hereinafter referred to as speed change gear shaft) are spaced away from each other. With this configuration, a chain is liable to oscillate by rocking motion of the swing arm (the fluttering or the rocking motion is great). In order to minimize this problem, the rocking shaft and the shaft of the speed change gear are preferably disposed as near as possible. Accordingly, if the outputting position of the speed change gear is limited to a position on the crankshaft, then the position of the rocking shaft is also limited, thus limiting the degree of freedom of the design of the position of the rocking shaft.

Further, if the speed change gear is disposed on the crankshaft, then the width (dimension in the leftward and rightward direction of the bicycle body) of the crankshaft is restricted by the width of the speed change gear. Therefore, the distance between left and right pedals is also limited.

SUMMARY AND OBJECTS OF THE INVENTION

It is an object of the present invention to provide a bicycle with a speed change gear which solves the problems of the prior art described above, wherein members of the speed change gear are arranged so that the degree of freedom of the design of a bicycle body frame can be improved.

In order to attain the object described above, according to a first aspect of the present invention, a bicycle with a speed change gear of an internal multistage type has a speed change gear shaft of the speed change gear is provided separately from a crankshaft and disposed in parallel to the crankshaft.

Further, according to a second aspect of the present invention, the bicycle with a speed change gear further includes a swing arm for supporting a rear wheel thereon, and the swing arm is supported for rocking motion on a main frame of a bicycle body by a rocking shaft provided in parallel to an axle of the rear wheel. Further, the rocking shaft and the speed change gear shaft are disposed in a neighboring relationship with each other.

Further, according to a third aspect of the present invention, the bicycle with a speed change gear has a speed change gear shaft disposed nearer to a front portion of the bicycle body than the rocking shaft.

According to a fourth aspect of the present invention, the bicycle with a speed change gear further includes a gear wheel apparatus for transmitting rotation of the crankshaft to the speed change gear, and the gear wheel apparatus, the speed change gear and the crankshaft are supported on a common case. According to a fifth aspect of the present invention, the speed change gear further inculcates a chain type transmission apparatus for transmitting rotation of the crankshaft to the speed clinger gear.

Further, according to a sixth aspect of the present invention, the bicycle with a speed change gear includes an input power shaft rotated by the crankshaft, at least one linkage connected eccentrically to the input power shaft in such a manner as to perform a rocking movement in response to a rotational angle of the input power shaft, a one-way clutch for connecting the linkage to the speed change gear shaft to move the speed change gear shaft in a pulsating manner in one direction in an interlocking relationship with the rocking movement of the linkage, and speed changing operation means for adjusting the rocking angle of the linkage with respect to the rotational angle of the input power shaft to change the rotational angle of the speed change gear shaft with respect to the rotational angle of the input power shaft.

Furthermore, according to a seventh aspect of the present invention, the bicycle with a speed change gear also includes a plurality of linkages, the linkages being connected in an angularly equally spaced relationship from each other in a circumferential direction to the input power shaft and perform rocking movements with different phases from each other in synchronism with rotation of the input power shaft.

Further, according to an eighth of the present invention, the bicycle with a speed change gear has a crankshaft and the input power shaft which mesh with each other with a speed increasing mechanism interposed therebetween.

Furthermore, according to ninth aspect of the present invention, the bicycle with a speed change has a crankshaft and the input power shaft which mesh with each other with an unequal speed rotation transmitting mechanism interposed therebeteen.

According to the first to fifth aspects of the present invention, the speed change gear shaft is not disposed coaxially with the crankshaft, but a free position can be selected in accordance with the configuration of the bicycle body. Particularly, according to the second aspect, once the position of the rocking shaft for the rocking arm is determined, the speed change gear shaft can be disposed in the proximity of the position. Accordingly, in contrast to an arrangement wherein the speed change gear shaft is disposed coaxially on the crankshaft, even if the rocking shaft is not arranged in the proximity of the crankshaft, fluttering of a chain for transmitting driving power to the rear wheel can be reduced without provision of a rear derailleur.

According to the third aspect of the present invention, fluttering of the chain caused by the rocking motion of the swing arm can be reduced when compared with that of an alternative arrangement, wherein the speed change gear shaft is disposed rearwardly of the rocking shaft. Meanwhile, according to the fourth aspect, the speed change gear and the gear wheel apparatus can be accommodated compactly in the case. Further, according to the fifth aspect, the degree of freedom in selection of the relative positions of the crankshaft and the speed change gear can be raised.

According to the sixth aspect, since the speed change gear mechanism which connects the input power shaft driven to rotate by the crankshaft and the speed change gear shaft to each other is formed from a link unit which does not use a gear wheel, generation of noise is suppressed and the speed change gear mechanism is reduced in weight.

According to the sevenths aspect, since the input power shaft and the speed change gear shaft are connected to each other by a plurality of linkages, the degree of freedom in arrangement of the crankshaft and the speed change gear shift is increased.

According to the eighth aspect, since the speed increasing mechanism is provided between the crankshaft and the input power shaft, the period of pulsation in the speed of rotation of the speed change gear shaft is reduced. Consequently, while increase of the weight and increase of the size are suppressed, such an agreeable travelling performance that the driver little feels the pulsation of the speed of rotation can be achieved.

According to the ninth aspect, since the unequal speed rotation transmitting mechanism is disposed between the crankshaft and the input power shaft, if gear wheels are combined so that, at each change gear ratio, the speed of rotation of the input power shaft may be minimum at a timing at which the speed of rotation of the speed change gear shaft is maximum and the speed of rotation of the input power shaft may be maximum at another timing at which the speed of rotation of the speed change gear shaft is minimum, then the pulsation of the speed of rotation of the speed change gear shaft can be further reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present illustration will become more fully understood from the detailed description given hereinbelow and the accompanying drawings which are given by way of illustration only, and thus are not limitative of the present invention.

FIGS. 18(A) and (B) are schematic views illustrating rocking angular ranges of a rocking member of the non-stage speed change gear apparatus of FIG. 7, wherein FIG. 18(A) illustrates the rocking angular range at a minimum change gear ratio and FIG. 18(B) illustrates the rocking angular range at a maximum change gear ratio;

FIGS. 19(A) and (B) are views illustrating angular velocities of a speed change gear shaft of the non-stage speed change gear apparatus of FIG. 7, wherein FIG. 19(A) illustrates the angular velocity at a minimum change gear ratio and FIG. 19(B) illustrates the angular velocity at a minimum change gear ratio;

FIGS. 20(A) and (B) are views illustrating components of driving force within one rotation of an input power shaft of the non-stage speed change gear apparatus of FIG. 7, and wherein FIG. 20(A) illustrates the component of force at a minimum change gear ratio and FIG. 20(B) illustrates the component of force at a maximum change gear ratio.

DETAILED DESCRIPTION OF THE PREFERRED EMBODIMENTS

Figure 1:
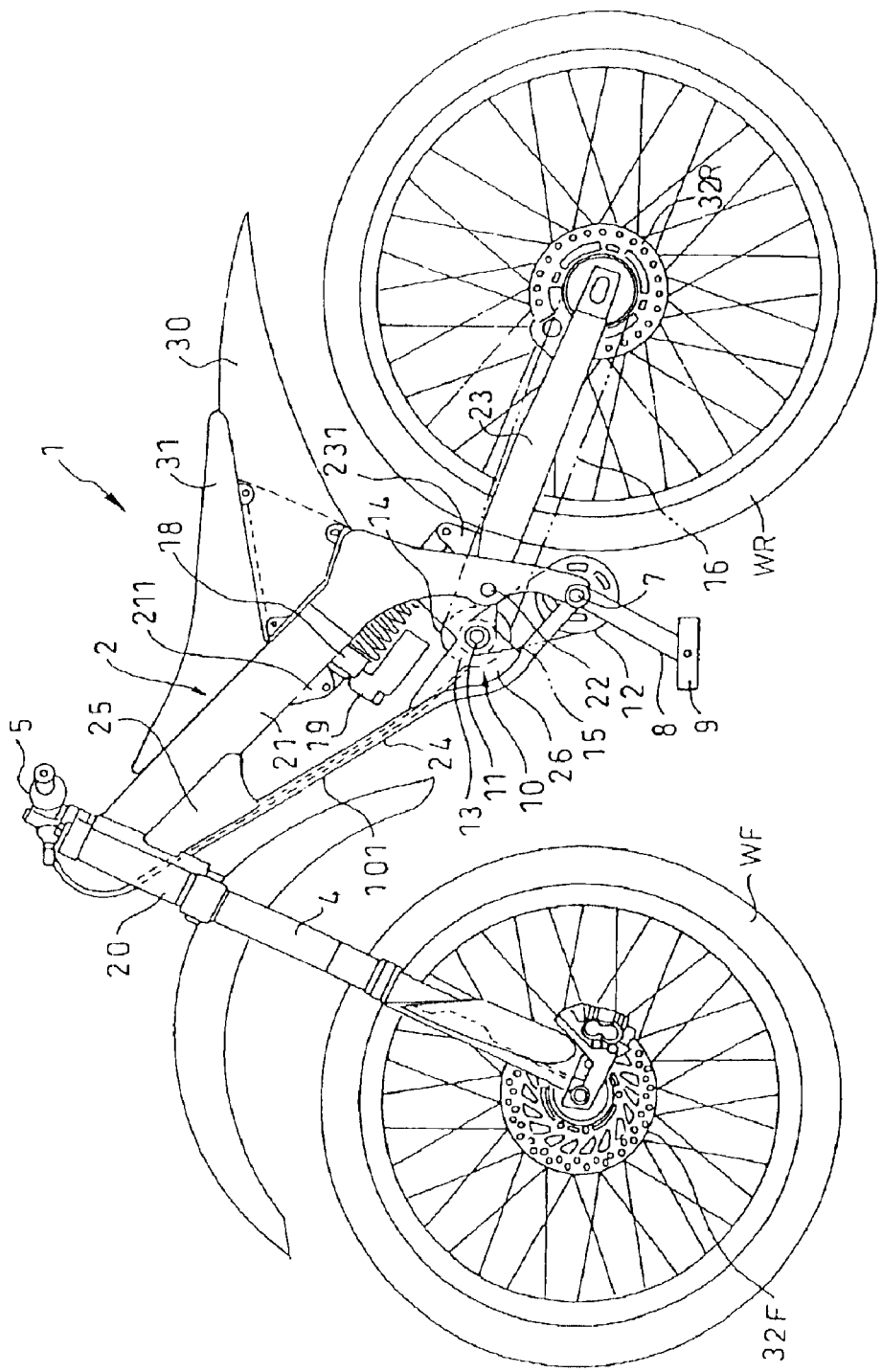
FIG. 1 is a side elevational view of a bicycle within a speed change gear according to an embodiment of the present invention.

In the following, an embodiment of the present invention is described with reference to the drawings. FIG. 1 is a side elevational view of a bicycle with a speed change gear according to an embodiment of the present invention. A bicycle body frame 2 of the bicycle 1 includes a head pipe 20 and a main frame 21 extending obliquely downwardly rearwards in a leftward and rightward bifurcated configuration from the head pipe 20, and a swing arm 23 supported for upward and downward rocking motion on a rocking shaft 22 provided at a rear portion of the main frame 21. A reinforcement pipe 24 is provided below the main frame 21, and the reinforcement pipe 24 and the main frame 21 are coupled to each other by brackets 25 and 26. The swing arm 23 may be formed as a bifurcated swing arm.

A rear wheel WR is supported at a rear end of the swing 23. A front fork 4 is supported for pivotal motion on the head pipe 20 in such a manner that the bicycle 1 can be steered. The front fork 4 is formed as a combination of an outer tube and an inner tube and is of the inverted wherein the outer tube is positioned above the inner tube. A steering handle bar 5 is provided at an upper portion of the front work 4, and a front wheel WF is supported at a lower portion of the front fork 4.

A crankshaft 7 extending in the bicycle body widthwise direction is provided at a lower end of the main frame 21, and a pedal 9 is attached to the crankshaft 7 through a crank 8. A pair of cranks 8 and a pair of pedals 9 are provided on the left and right with respect to the crankshaft 7. A speed change gear 10 of the internal multistage type having a speed change gear shaft (shaft) 11 and and assembly of gear wheels hereinafter described) disposed around the shaft 11 is provided on the bracket 26 described above. The shaft 11 is disposed in parallel to the crankshaft 7 and in the proximity of the rocking shaft 22.

A driving sprocket wheel 12 is provided for the crankshaft 7, and an input power sprocket wheel 13 and an output power sprocket wheel 14 are provided for the speed change gear 10. Further, a rear wheel sprocket wheel (not shown) is provided on the rear wheel WR. The driving sprocket wheel 12 of the crankshaft 7 and the input power sprocket wheel 13 of the speed change gear 110 are consented to each other by a chain 15, and the output power sprocket wheel 14 of the speed change gear 10 anal the rear wheel sprocket wheel are connected to each other by another chain 16.

A bracket 231 is provided on the swing arm 23, aid another bracket 211 is provided on the main frame 21. A cushion apparatus 18 for moderating a shock when the swing arm 23 is pivoted upwardly is provided between the brackets 231 and 211. Working fluid is supplied from a reservoir tank 19 to the cushion apparatus 18.

A rear fender 30 is mounted on the main frame 21, and a saddle 31 is mounted such that it extends between the rear fender 30 and the main frame 21. The rear fender 30 can be formed from a light-weighted material such as carbon fibers. Disk brakes 32F and 32R are provided for the front wheel WF and the rear wheel WR, respectively. Further, a speed change gear operating cable 101 extending from a speed change lever not shown provided on the steering handle bar 5 extends to the speed change gear 10 along the reinforcement pipe 24 described hereinabove.

Figure 2:
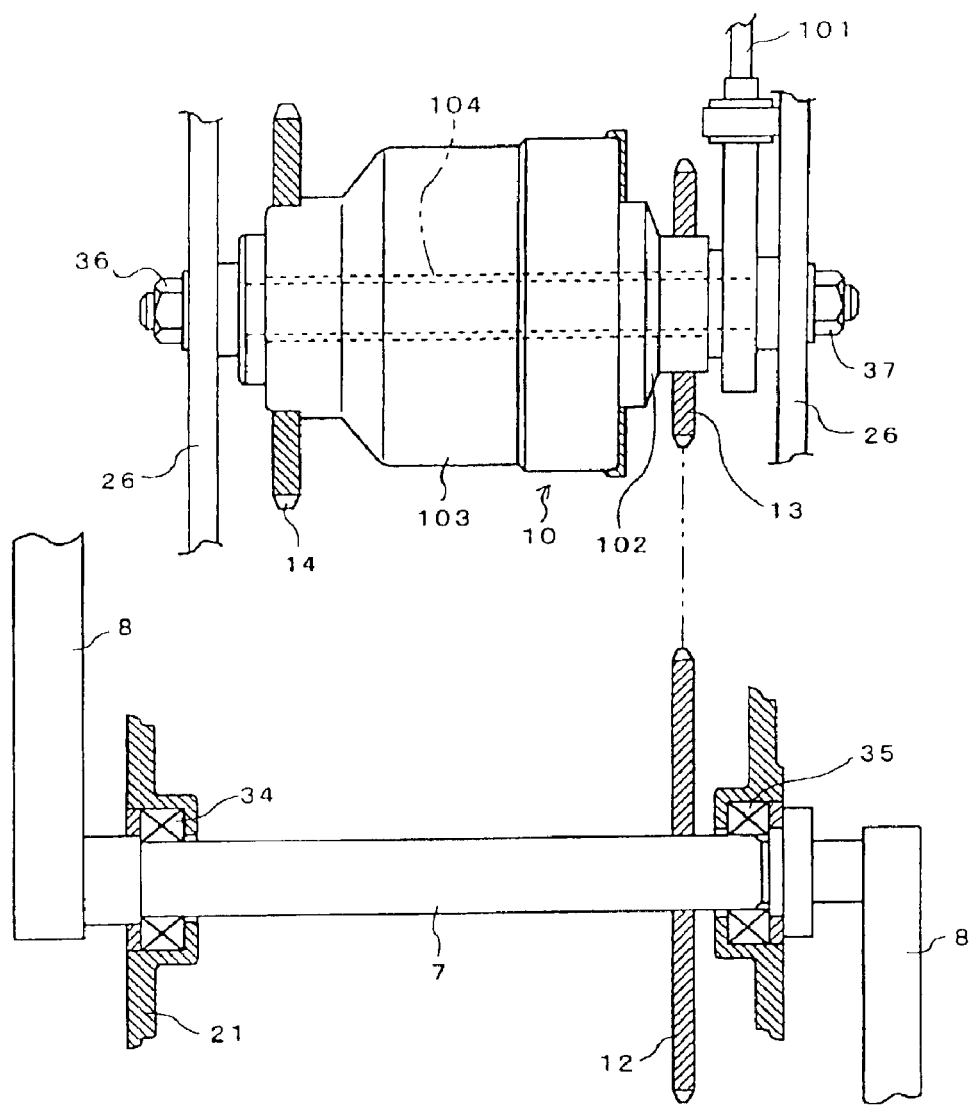
FIG. 2 is a sectional view of essential part of the bicycle showing a treadling force transmitting mechanism.

FIG. 2 is a sectional view of essential part of the bicycle 1 taken at a position including the crankshaft 7 and the shaft 11. Referring to FIG. 2, the crankshaft 7 to which the driving sprocket wheel 12 is secured is mounted for rotation on the main frame 21 by means of bearings 34 and 35. Meanwhile, the shaft 11 of the speed change gear 10 is secured to brackets 26, 26 by means of nuts 36 and 37 screwed on threaded portions formed at the opposite ends thereof. The speed change gear 10 has an input driving member 102 which is rotatable relative to the shaft 11, and the input power sprocket wheel 13 is coupled to the input driving member 102.

Further, a housing 103 is mounted for rotation on the shaft 11, and rotation of the input driving member 102 is transmitted to the housing 103 with the speed thereof changed by a speed change gear wheel section (hereinafter described). The output power sprocket wheel 14 is secured to the housing 103. A plurality of one-way clutches (hereinafter described) for bringing a gear wheel into engagement with the shaft 11 are provided in the speed change gear wheel section, and the one-way clutches are changed over between operative and inoperative conditions for each of change gear stages. An operation cam 104 for changing over the one-way clutches is provided. The operation cam 104 is cylindrical and is provided along an outer periphery of the shaft 11 concentrically with the shaft 11.

The operation cam 104 is rotated to a predetermined position set for each change gear stage with respect to the shaft 11 by an operation of the operating cable 101 described hereinabove. Then, at a position corresponding to each change gear stage, an arresting member (pawl) of a predetermined one of the plurality of one-way clutches is engaged with a gear wheel corresponding to the one-way clutch and the shaft 11.

Figure 3:
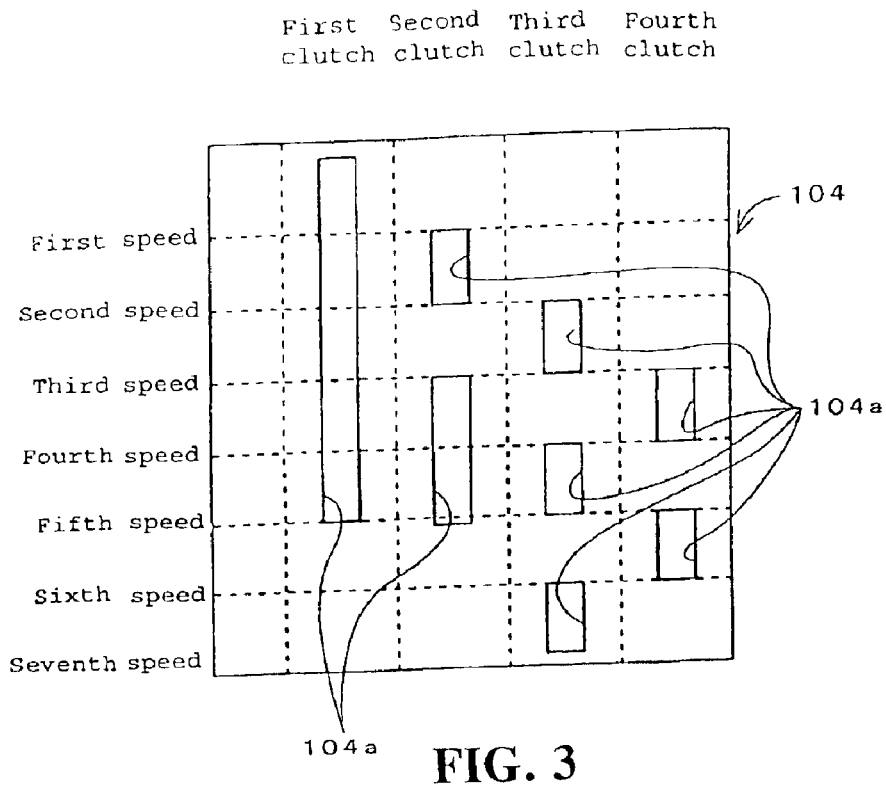
FIG. 3 is a developed view of a one-way clutch operating cam.

FIG. 3 is a development of the operation cam 104 for the one-way clutches and shows a portion over one third of a circumference, that is, over a central angle 120°. Through-holes 104a through which a pawl of a one-way clutch can project are formed in the operation cam 104. The pawl of each one-way clutch is configured in such a manner as to pivot with respect to a holder thereof, and if one end of the pawl projects into and through a through-hole 104a and is engaged with the shaft 11, there the other end of the pawl is engaged with a groove formed on a gear wheel for speed change. Accordingly, by setting the positions of the through-holes 104a corresponding to the individual change gear stages, a predetermined one of the speed change gear wheels can be engaged with the speed change gear shaft 11 for each of the change speed stages.

As seen in FIG. 3 wherein the cylindrical operation cam 104 is shown with numbers of the change gear stages (first-speed to seventh speed) and the one-way clutches applied thereto, for each change gear stage, a one-way clutch or clutches to operate, that is, a one-way clutch or clutches which can engage with both of the shaft 11 and a speed change gear wheel, are set. For example, at the first speed, only a first one of the one-way clutches which bring the shaft 11 and predetermined ones of the speed change gear wheels into engagement with each other is in an operable state (hereinafter referred to as "on") while the other one-way clutches are in a non-operable state (hereinafter referred to as "off").

At the second speed, the first and second one-way clutches and on, and at the third speed, the first and third one-way clutches are on. At the fourth speed, the first, second and fourth one-way clutches are on, and at the fifth speed, the first to third one-way clutches are on. Further, at the sixth speed, the fourth one-way clutch is on, and at the seventh speed, the third one-way clutch is on.

Figure 4:
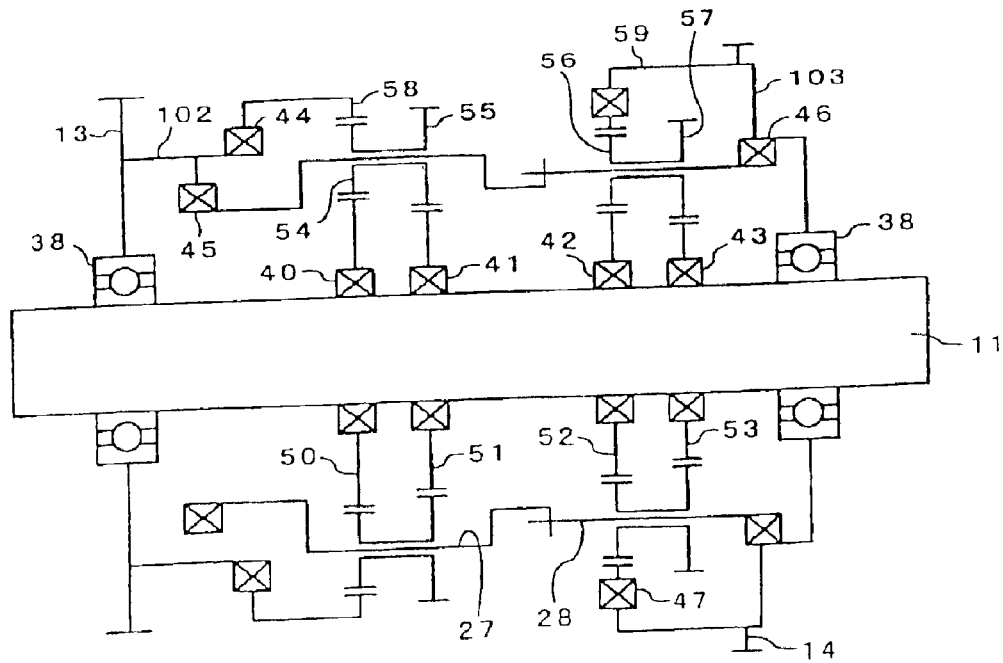
FIG. 4 is a schematic view showing a configuration of an internal multistage speed change gear.

Subsequently, changeover of the speed change gear wheels by the operation cam 104 is described with reference to FIG. 4. Referring to FIG. 4, on the shaft 11, a first sun gear wheel (sun gear wheel) 50 is provided through a first one-way clutch 40; a second sun gear wheel 51 is provided through a second one-way clutch 41; a third sun gear wheel 52 is provided through a third one-way clutch 42; and a fourth sun gear wheel 53 is provided through a fourth one-way clutch 43.

A planetary gear wheel (carrier) 54 meshes with the sun gear wheel 50, and another carrier 55 meshes with the sun gear wheel 51. The carrier 54 and the carrier 55 are integral with each other, and an internal gear wheel (ring gear wheel) 58 meshes with the carrier 54 of a small diameter.

The input driving member 102 having the input power sprocket wheel 13 to the outer periphery thereof is supported on the shaft 11 by a pair of bearings 38. The ring gear wheel 58 described hereinabove is connected to the input driving member 102 through a one-way clutch 44.

A carrier 56 meshes with the sun gear wheel 52, and another carrier 57 meshes with the sun gear wheel 53. The carrier 56 and the carrier 57 are integral with each other, and a ring gear wheel 59 meshes with the carrier 56 of a small diameter. The carriers 54 and 55 are supported for rotation by a carrier plate 27, and the carriers 56 and 57 are supported for rotation by another carrier plate 28. The carrier plates 27 and 28 are provided in engagement with each other such that they can rotate integrally with each other around the shaft 11, that is, around the sun gear wheels 50, 51, 52 and 53.

Further, the carrier plate 27 is connected to the input driving member 102 through a one-way clutch 45, and the carrier plate 28 is connected to the housing 103 through another one-way clutch 46. Furthermore, the housing 103 is connected through a one-way Clutch 47 to the ring gear wheel 59 meshing with the carrier 56. Meanwhile, the output power sprocket wheel 14 is secured to an outer periphery of the housing 103, and the housing 103 is supported on the shaft 11 by the bearings 38.

Transmission action of power (treadling force) for each change gear stage in the configuration described above is described with reference to FIG. 4. At the first speed, the one-way clutch 40 is on and the one-way clutches 41 to 43 are off. Power is inputted from the input power sprocket wheel 13 through the input driving member 102 and transmitted to the ring gear wheel 58 through the one-way clutch 44. Further, rotation of the ring gear wheel 58 is transmitted to the carrier 54. Further, the power is transmitted from the input driving member 102 to the carrier plate 27 through the one-way clutch 45.

The carrier 54 revolves around the shaft 11 at a speed calculated in accordance with a calculation expression {Z58/(Z58+Z50)} based on the number Z58 of teeth of the ring gear wheel 58 and the number Z50 of teeth of the first sun gear wheel 50, and the revolution of the carrier 54 is transmitted to the carrier plates 27 and 28. The revolving motion of the carrier plate 28 is further transmitted to the housing 103 through the one-way clutch 46 and is finally converted into rotation of the output power sprocket wheel 14.

At the second speed, the one-way clutches 40 and 41 are on and the one-way clutches 42 and 43 are off. At the second speed, the power inputted to the input driving member 102 is transmitted to the output power sprocket wheel 14 along the same route as at the first speed.

However, since the one-way clutches 40 and 41 are on, the number of revolutions of the carrier plate 27 is calculated, from a combination of the carrier 54 (the number of teeth: Z54), the sun gear wheel 51 (the number of teeth: Z51) which meshes with the carrier 55 (the number of teeth: Z55) and the ring gear wheel 58 (the number of teeth: Z58), in accordance with a calculation expression {(Z58−Z55)/((Z54−Z51)+(Z58−Z55))}, and the reduction ratio is lower than that at the first speed. It is to be noted that, while, at the second speed, the one-way clutches 40 and 41 are on, only the one-way clutch 41 which is connected to the high speed side acts substantially in and on state.

At the third speed, the one-way clutches 40 an 42 are on and the one-way clutches 41 and 43 are off. At the third speed, rotation of the input driving member 102 is transmitted to the carrier plate 27 at the same reduction ratio as at the first speed. However, at the third speed, since the one-way clutch 42 is on, revolution of the carrier plate 28 is transmitted from the one-way clutch 47 to the housing 103 not through the one-way clutch 46 but through rotation of the carrier 56 and the ring gear wheel 59. In particular, the revolution of the carrier plate 28 is transmitted to the ring gear wheel 59 at a speed raised in accordance with a calculation expression {(Z59+Z52)/Z59} from the combination of the ring gear wheel 59 (the number of teeth: Z59) and the sun gear wheel 52 (the number of teeth: Z52), and is outputted to the output power sprocket wheel 14.

At the fourth speed, the one-way clutches 40, 41 and 43 are on and the one-way clutch 42 is off. At the fourth speed, rotation of the input driving member 102 is transmitted at the same reduction ratio as at the second speed to the carrier plate 27. However, at the fourth speed, since the one-way Clutch 43 is on, revolution of the carrier plate 28 is transmitted from the one-way clutch 47 to the housing 103 not through the one-way clutch 46 but through rotation of the carriers 57 and 56 and the ring gear wheel 59. In particular, the revolution of the carrier plate 28 is transmitted to the ring gear wheel 59 at a speed raised in accordance with a calculation expression $(1+((Z56-Z53)/(Z59-Z57)))$ from the combination of the ring gear wheel 59 (the number of teeth: Z59), carrier 56 (the number of teeth: Z56), carrier 57 (the number of teeth: Z57) and sun gear wheel 53 (the number of teeth: Z53), and is outputted to the output power sprocket wheel 14.

At the fifth speed, the one-way clutches 40, 41 and 42 are on and the one-way clutch 43 is off. Accordingly, at the fifth speed, rotation of the input driving member 102 is transmitted to the carrier plate 27 at the same reduction ratio as at the second speed. Further, similarly as at the third speed, revolution of the carrier plate 28 is transmitted from the one-way clutch 47 to the housing 103 through rotation of the carrier 56 and the ring gear wheel 59. In particular, the revolution of the carrier plate 28 based on the same reduction ratio as at the second speed is transmitted to the ring gear wheel 59 at a speed raised in accordance with a calculation expression $((Z59+Z52)/Z59)$ from the combination of the ring gear wheel 59 (the number of teeth: Z59) and the third sun gear wheel 52 (the number of teeth: Z52), and is outputted to the output power sprocket wheel 14.

At the sixth speed, the fourth one-way clutch 43 is on and the one-way clutches 40 to 42 are off. At the sixth speed, since both of the sun gear wheels 50 and 51 can rotate freely, the carriers 54 and 55 rotate idly. Accordingly, rotation of the input driving member 102 is transmitted not from the one-way clutch 44 but from the one-way clutch 45 to the carrier plate 27. In other words, the input rotation is transmitted to the carrier plate 28 but not at a reduced speed and is then transmitted from the carrier plate 28 to the housing 103 at a speed raised through the carrier 56 and the ring gear wheel 59.

At the seventh speed, the third one-way clutch 42 is on and the one-way clutches 40, 41 and 43 are off. Also at the seventh speed, similarly as at the sixth speed, both of the sun gear wheels 50 and 51 call rotate freely, and therefore, the carriers 54 and 55 rotate idly. Accordingly, rotation of the input driving member 102 is transmitted not from the one-way clutch 44 but from the one-way clutch 45 to the carrier plate 27. In particular, the input rotation is transmitted to the carrier plate 28 but not at a reduced speed and is then transmitted from the carrier plate 28 to the housing 103 at a speed raised through the carrier 56 and the ring gear wheel 59. It is to be noted, however, that, through the combination of the sun gear wheel 52 and the carrier 56, the speed is further raised than that at the sixth speed.

While, in the embodiment described above, rotation of the crankshaft 7 is transmitted to the input power sprocket wheel 13 of the speed change gear 10 by the chain 15, this transmission mechanism can be modified in the following manner. In particular, by providing a driving gear wheel on the crankshaft 7 and securing a driven gear wheel in place of the sprocket wheel 13 to the input driving member 102 of the speed change gear 10 and then connecting the two gear wheels to each other directly or through an idle gear wheel depending upon the necessity in layout or the like, rotation can be transmitted from the crankshaft 7 to the speed change gear 10.

Figure 5:
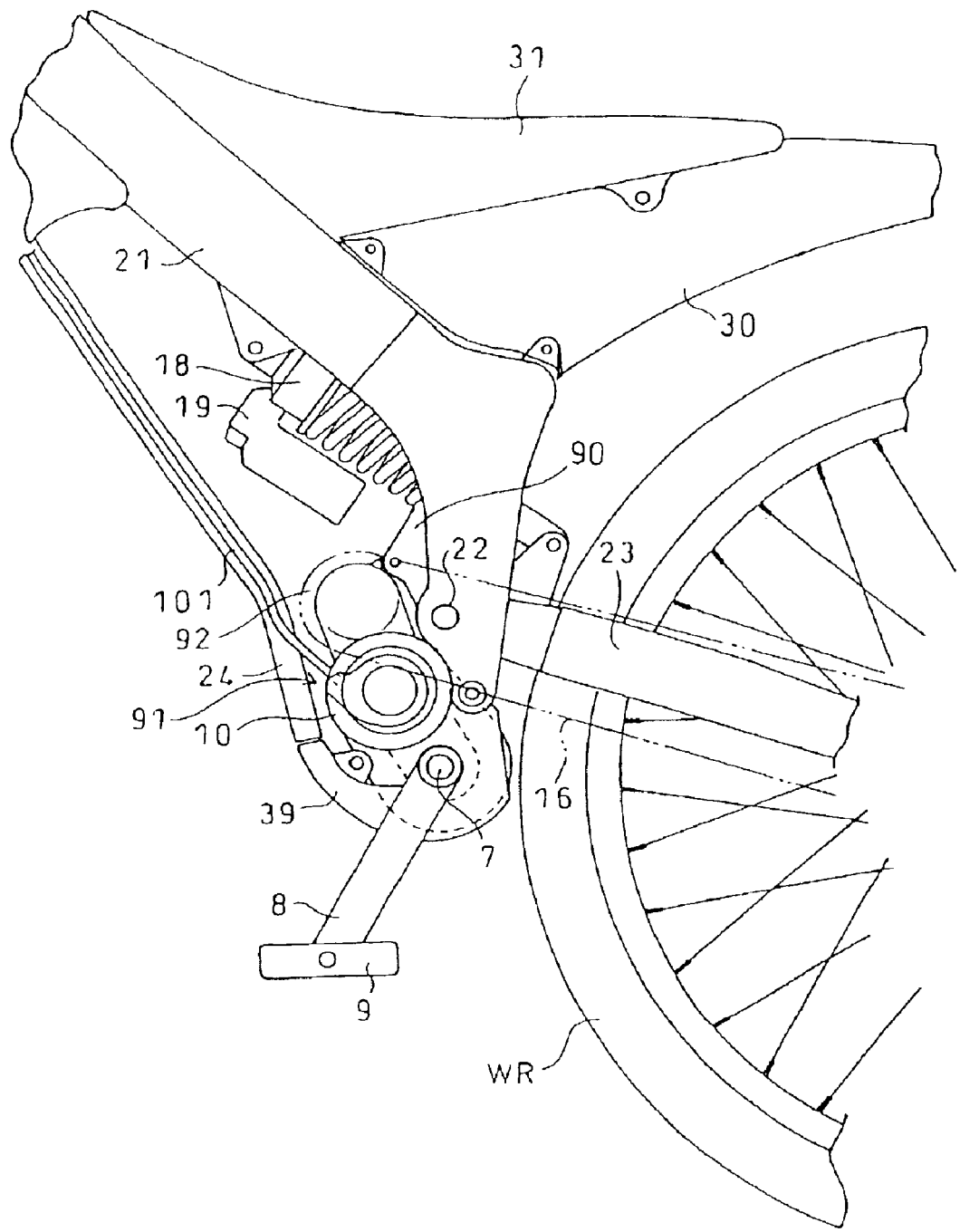
FIG. 5 is a side elevational view of essential part of a bicycle according to a second embodiment.

FIG. 5 is a side elevational view of essential part of a bicycle with a speed change gear to which a power transmission mechanism by gear wheels is applied, and like reference characters to those in FIG. 1 denote like or equivalent elements. Referring to FIG. 5, the main frame 21 and the reinforcement pipe 24 are connected at lower portions thereof to each other by a connection member 39, and a treadling force transmitting apparatus 91 is supported by the connection member 39 and a bracket 90 provided on the main frame 21. The treadling force transmitting apparatus 91 includes a gear train (hereinafter described) for transmitting rotation of the crankshaft 7 to the speed change gear 10, a driving sprocket wheel for transmitting output power of the speed change gear 10 to the rear wheel WR, and antihero gear train (hereinafter described) for transmitting output power of the speed change gear 10 to an output power sprocket wheel 92.

Figure 6:
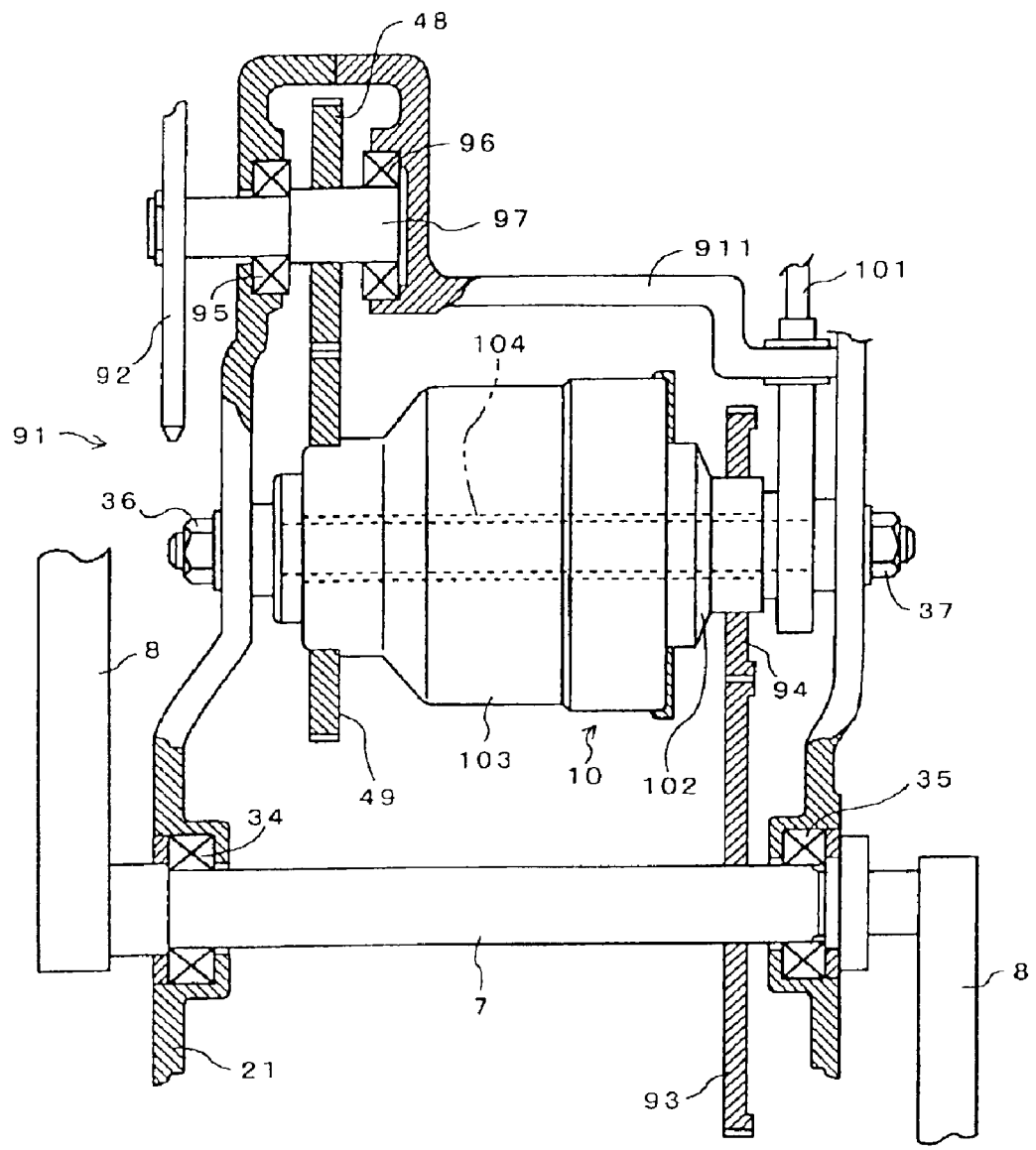
FIG. 6 is a sectional view of essential part of a treading force transmitting apparatus according to the second embodiment.

FIG. 6 is a sectional view of essential part of the bicycle 1 taken at a position including the crankshaft 7, the shaft of the speed change gear 10 and the output power sprocket wheel 92, and like reference characters to those in FIG. 2 denote like or equivalent elements. Referring to FIG. 6, a driving gear wheel 93 is secured to the crankshaft 7 included in the treadling force transmitting apparatus 91, and the driving gear wheel 93 meshes with an input power gear wheel 94 secured to the input driving member 102 of the speed change gear 10. An output power shaft 97 is supported on a case 911 of the treadling force transmitting apparatus 91 by means of bearings 95 and 96, and an output power gear wheel 48 is secured to the output power shaft 97. An intermediate gear wheel 49 is secured to the housing 103 of the speed change gear 10, and the intermediate gear wheel 49 meshes with the output power gear wheel 48. The output power shaft 97 projects outwardly from the case 911, and the output power sprocket wheel 92 is secured to a projecting end of the output power shaft 97.

Through the configuration described above, treadling force inputted from the crankshaft 7 is transmitted to the driving gear wheel 93 and the input power gear wheel 94. The speed of rotation of the input power gear wheel 94 is changed by the speed change gear 10, and the rotation of the changed speed is transmitted to the output power gear wheel 48 through the intermediate gear wheel 49. When the output power gear wheel 48 rotates, the output power shaft 97 on which the output power gear wheel 48 is supported and the output power sprocket wheel 92 rotate, and the power is transmitted to the rear wheel WR through the chain 16 extending around the output power sprocket wheel 92.

Figure 7:
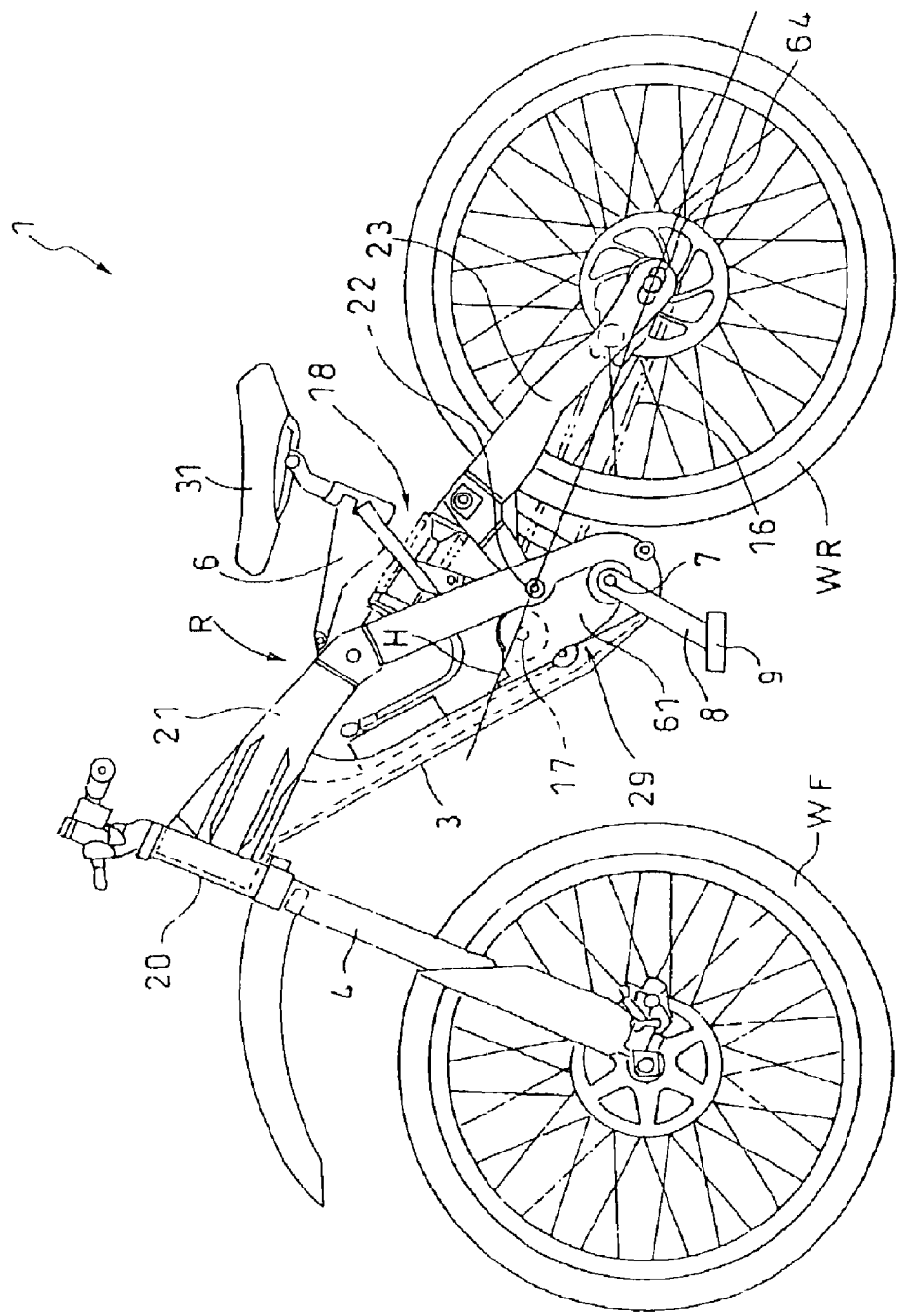
FIG. 7 is a left side elevational view of another embodiment of a bicycle with a speed change gear to which the present invention is applied.

FIG. 7 is a side elevational view of another embodiment of a bicycle with a speed change gear to which the present invention is applied, and like reference characters to those appearing hereinabove denote like or equivalent portions.

A bicycle body frame includes a head pipe 20 for supporting a pair of left and right front forks 4, which support a front wheel WF for rotation at lower end portions thereof, for steering operation, a pair of left and right main frames 21 extending obliquely rearwardly downwards from the head pipe 20, a down tube 3 extending obliquely rearwardly downwards from below front end portions of the two main frames 21, and a saddle frame 6 extending from middle portions of the main frames 21 for supporting a saddle 31 thereon.

A pair of left and right swing arms 23 which support a rear wheel WR for rotation at rear end portions thereof are supported at front end portions thereof for rocking motion on a rocking shaft 22 mounted at rear portions of the two main frames 21. The swing arms 23 are connected to middle portions of the main frames 21 through a cushion apparatus 18 and are rockable in upward and downward directions around the rocking shaft 22. A non-stage transmission apparatus 29 is disposed between rear portions of the two main frames 21 and a rear portion of the down tube 3.

Figure 8:
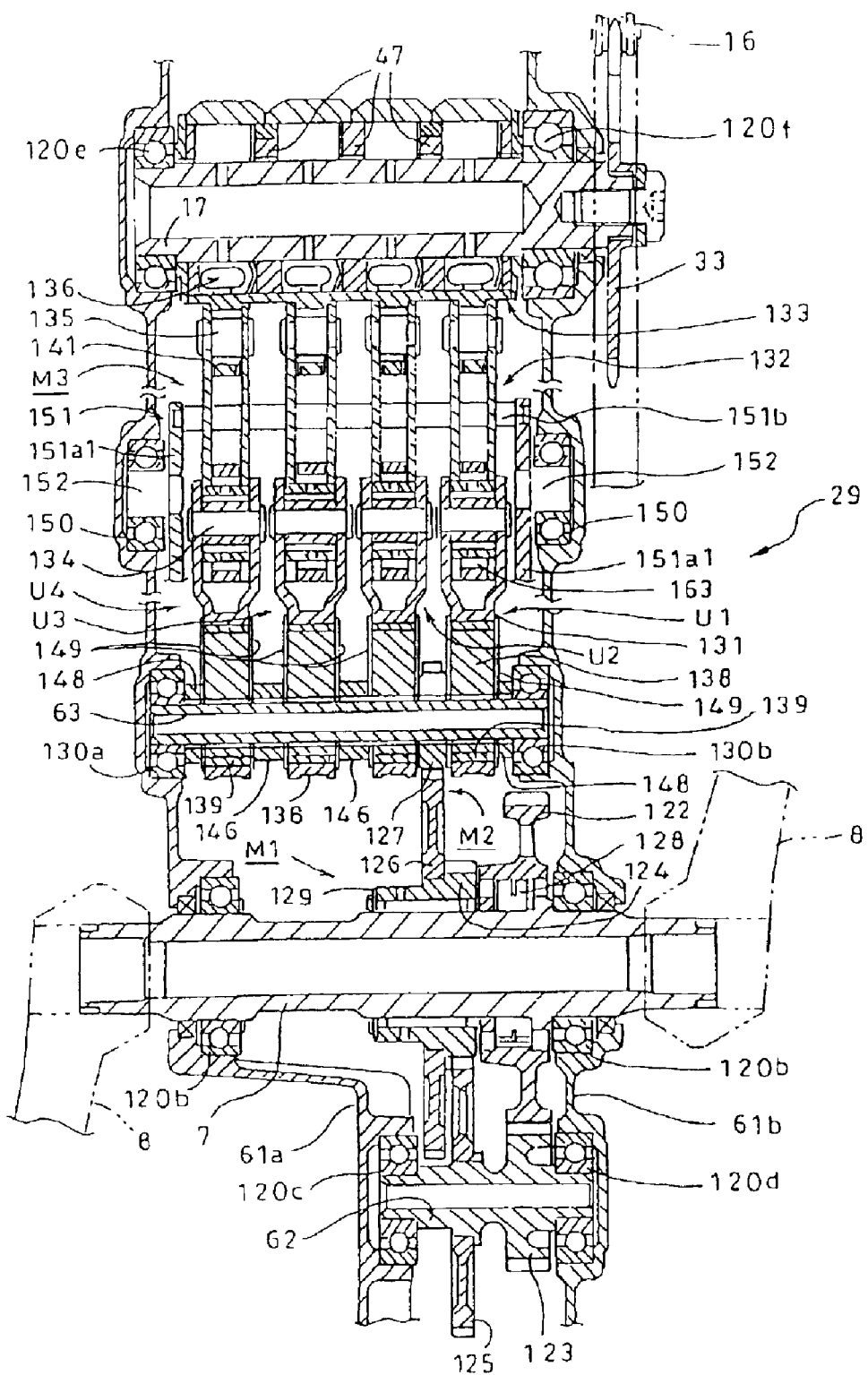
FIG. 8 is a sectional view taken along line X1—X1 and line X2—X2 of FIG. 9.

Referring also to FIG. 8, a speed change gear shaft 17 accommodated in a case 61 of the non-stage transmission apparatus 29 is coupled at a right end portion thereof, which projects outwardly from the case 61, to a driving sprocket wheel 33, and a chain 16 extends between the driving sprocket wheel 33 and a driven sprocket wheel 60 (refer to FIG. 16) of the rear wheel WR. The non-stage transmission apparatus 29 is disposed on the bicycle body frame such that the speed change gear shaft 17 may be positioned in the prolixity of an imaginary plane H which includes center axes of the rocking shaft 22 and a rear wheel axle 64.

Torque inputted to the crankshaft 7 is transmitted through the speed change gear shaft 17 of the non-stage transmission apparatus 29, the driving sprocket wheel 33, the chain 16 and the driven sprocket wheel 60 to these rear wheel WR, which serves as a driving wheel, to drive the rear wheel WR to rotate.

The non-stage transmission apparatus 29 is described with reference to FIGS. 8 and 9. Portions of the crankshaft 7 in the proximity of the opposite ends, the opposite end portions of an idle shaft 62 and portions of the speed change gear shaft 17 in the proximity of the left end portion and the right end portion are supported for rotation through pairs of left and right bearings 120a and 120b; 120c and 120d; and 120e and 120f on the case 61 formed from a pair of left and right case portions 61a and 61b which are coupled to each other by bolts. A first driving gear wheel 122 and a second driven gear wheel 124 are provided in order from the right bearing 120b side on the crankshaft 7. The first driving gear wheel 122 is connected to drive the crankshaft 7 through a one-way clutch 128 which transmits torque only in a forward direction AO (direction in which the bicycle is advanced. In the following, the directions of rotation of the shafts and the sprocket wheels when the crankshaft 7 rotates forwardly are indicated by reference character AO) to the first driving gear wheel 122. The one-way clutch 128 is coupled to the crankshaft 7 by a key member not shown. The second driven gear wheel 124 is supported for rotation on the crankshaft 7 through a bearing 129.

A first driven gear wheel 123 which meshes with the first driving gear wheel 122 and a second driving gear 30 wheel 125 which meshes with the second driven gear wheel 124 are provided on the idle shaft 62. A third driving gear wheel 126 is secured integrally in a neighboring relationship to the second driven gear wheel 124, and the third driving gear wheel 126 meshes with a third driven gear wheel 127 spline-coupled to an input power shaft 63. The input power shaft 63 is supported at the opposite ends thereof for rotation on the two case portions 61*a* and 61*b* by bearings 130*a* and 130*b*.

The driving gear wheels 122, 125 and 126 have diameters greater than the driven gear wheels 123, 124 and 127 which mesh with them, respectively, and therefore, the driving gear wheels 122, 125 and 126 and the driven gear wheels 123, 124 and 127 which mesh with each other form three speed increasing stages. Therefore, the input 11 power shaft 63 which is driven to rotate by the crankshaft 7 through the speed increasing mechanism M1 which has the three speed increasing stages rotates at a rotational speed raised with respect to the speed of rotation of the crankshaft 7, in the present embodiment, at a speed of rotation raised to approximately 11 times.

Figure 10A:
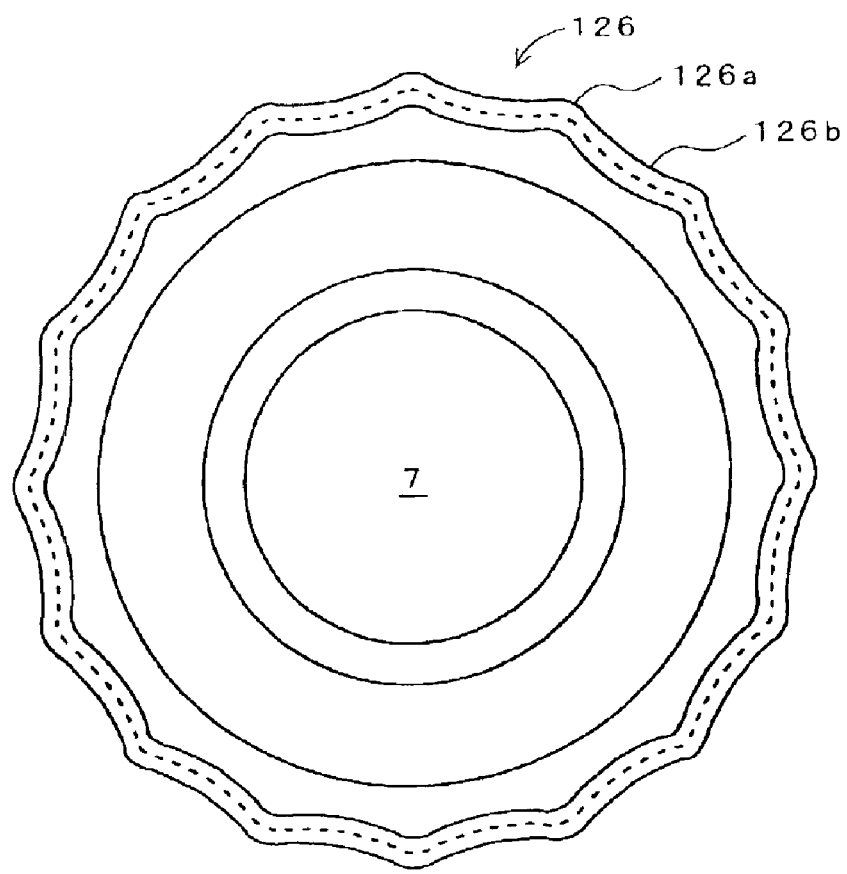
FIGS. 10(A) and (B) are front elevational views of a gear wheel which composes an unequal speed rotation transmitting mechanism of the non-stage speed change gear apparatus of FIG. 7.
Figure 10B:
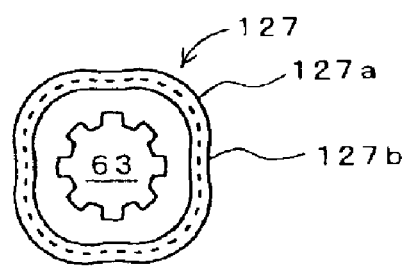

The third driving gear wheel 126 and the third driven gear wheel 127 are each formed from a non-circular gear as shown in FIGS. 10(A) and (B) and form all unequal speed rotation transmitting mechanism M2 for causing the input power shift 63 to effect non-uniform speed rotational motion. More particularly, the third driven gear wheel 127 is a gear wheel having a number of peak portions 127*a* and valley portions 127*b* equal to the number of link units U1 to U4 provided in the non-stage transmission apparatus 29 and hereinafter described, in the present embodiment, having four peak portions 127*a* and four valley portions 127*b*. The third driving gear wheel 126 is a gear wheel having an integral number of times the number of peak portions 127*a* and valley portions 127*b* of the third driving gear wheel 127, in the present embodiment, having 16 peak portions 126*a* and 16 valley portions 126*b* equal to four times the number of the peak portions 127*a* and valley portions 127*b*.

The timing at which a valley portion 126*b* of the third driving gear wheel 126 and a peak portion 127*a* of the third driven gear wheel 127 are brought into meshing engagement with each other and the timing at which a peak portion 126*a* of the third driving gear wheel 126 and a valley portion 127*b* of the third driven gear wheel 127 are brought into meshing engagement with each other are set so as to coincide with the timinigs at which rotation of the speed change gear shaft 17 which rotates in a pulsating fashion exhibits the highest speed and the lowest speed, respectively, as hereinafter described. In other words, the crankshaft 7 and the input power shaft 63 are connected for driving motion by the unequal speed rotation transmitting mechanism M2 incorporated in the speed increasing mechanism M1 for reducing the pulsation of the speed of rotation of the speed change gear shaft 17.

Figure 9:
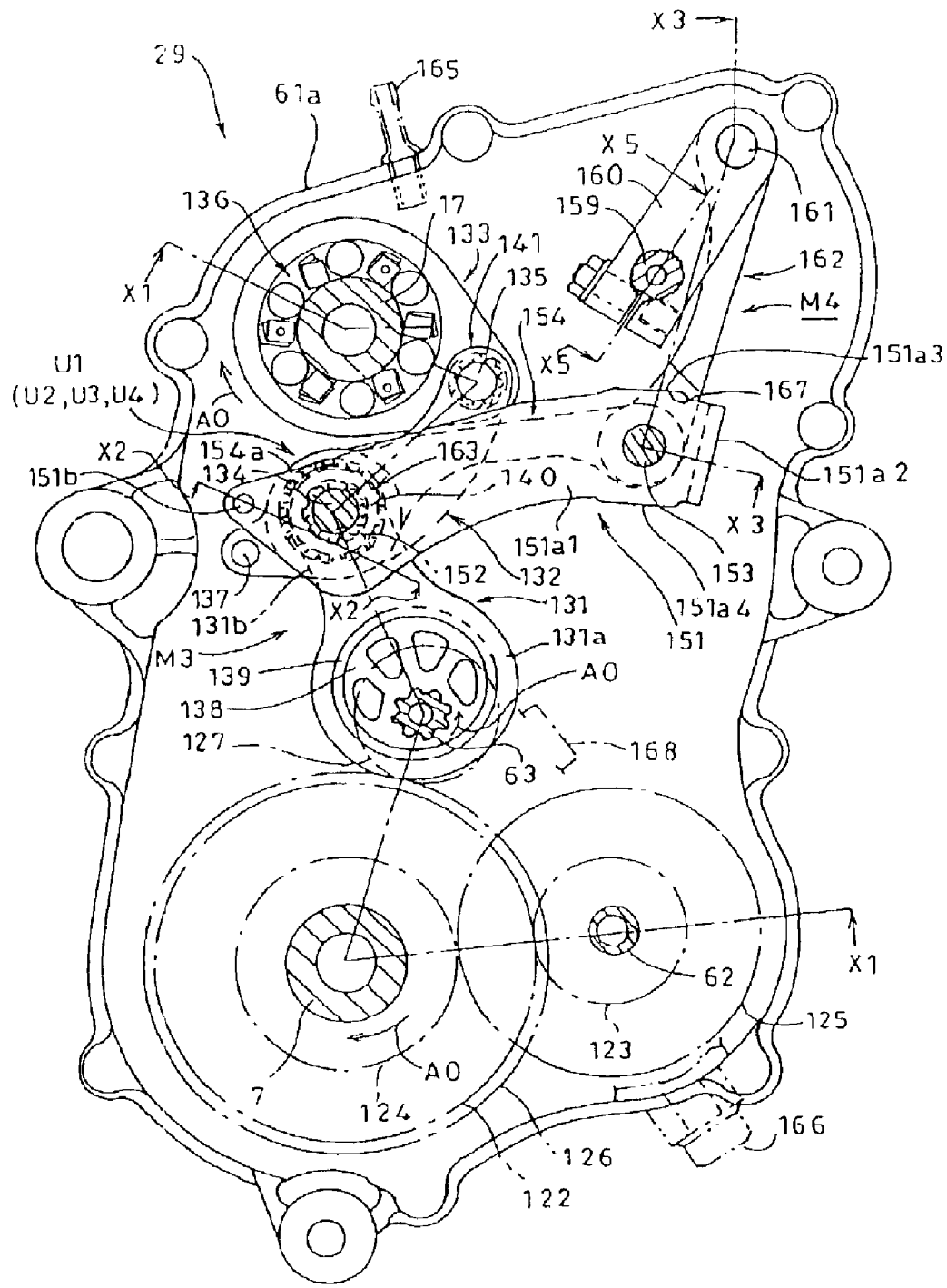
FIG. 9 is a right side elevational view of a non-stage speed change gear apparatus of FIG. 7 in a minimum change gear ratio state where a right case portion is removed and various shafts are shown in cross section.

Referring to FIGS. 8 and 9, the input power shaft 63 is connected to the speed change gear shaft 17 through a plurality of, four in the present embodiment, link units U1 to U4 which form a speed changing mechanism M3. The speed changing mechanism M3 is operated by a speed changing operation mechanism M4 which acts when the (driver operates a gear lever (not shown) as a speed changing operation member and changes the change gear ratio, which is a ratio of the speed of rotation of the speed change gear shaft 17 to the speed of rotation of the crankshaft 7, in a non-stage fashion.

Figure 11:
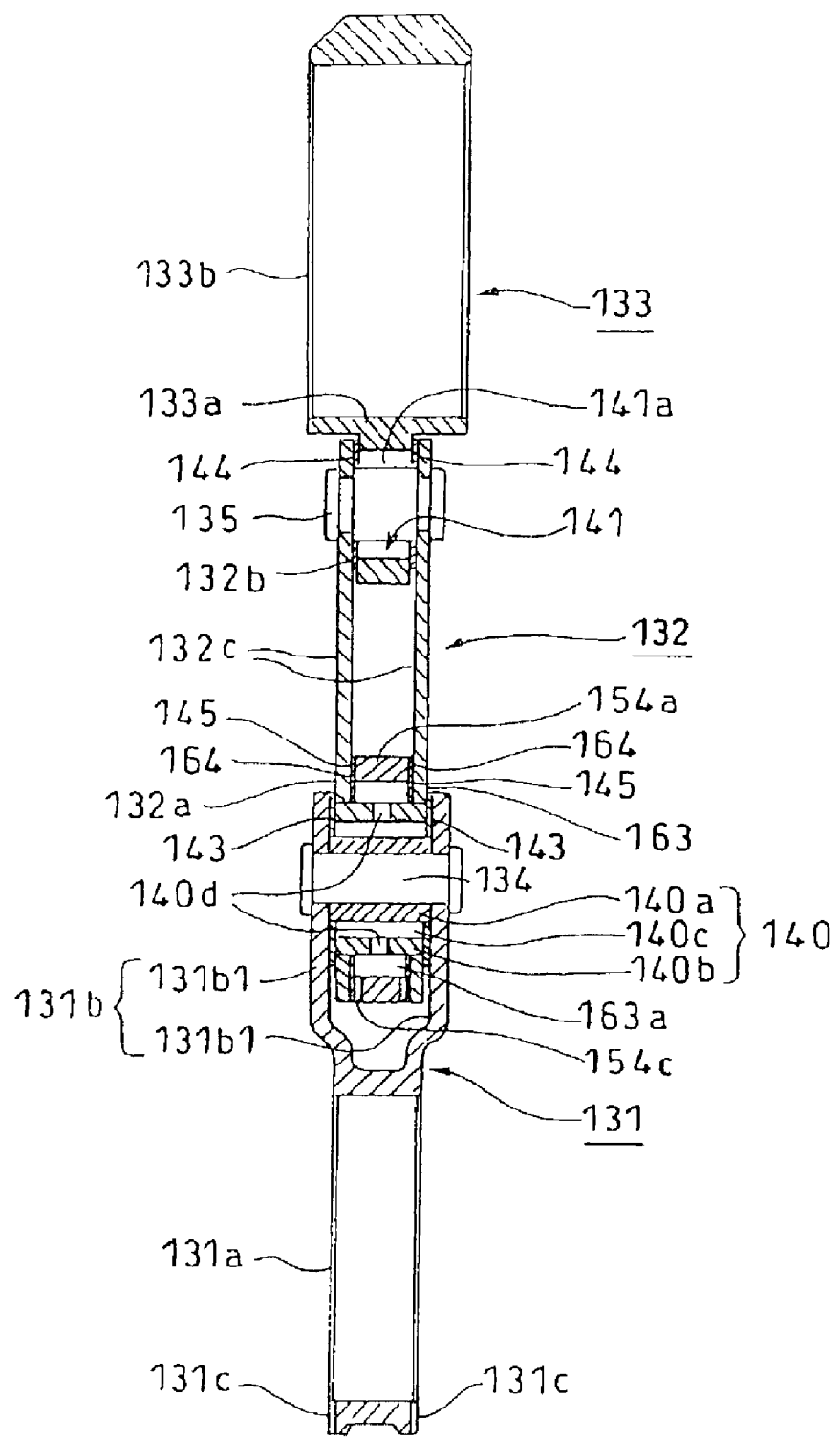
FIG. 11 is a sectional view taken along line X4—X4 of FIG. 7.
Figure 12:
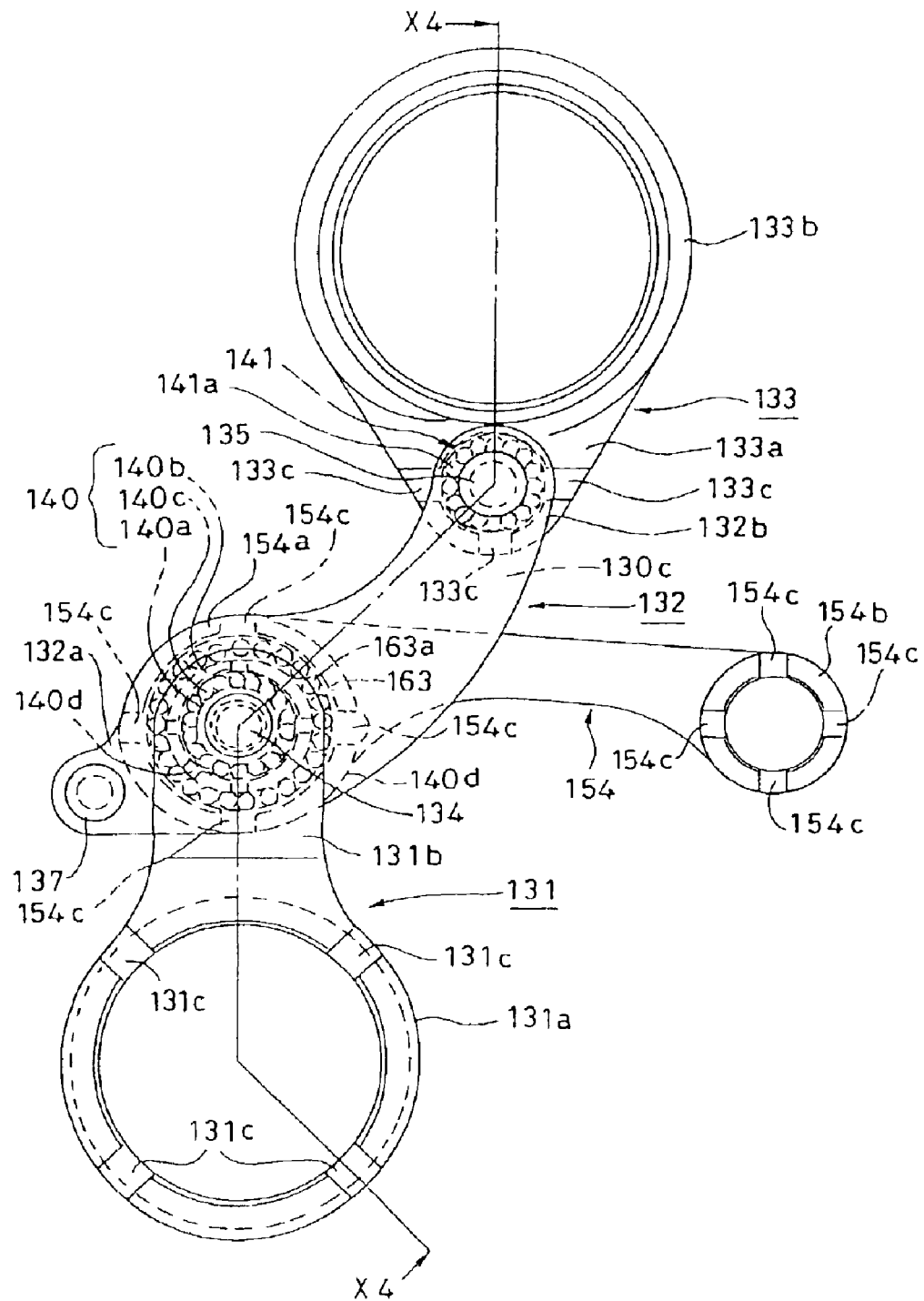
FIG. 12 is a right side elevational view of a link unit which composes a speed change gear mechanism of the non-stage speed change gear apparatus of FIG. 7.

Referring also to FIGS. 11 and 12, each of the link units U1 to U4 includes a driving link 131 mounted eccentrically for pivotal motion on the output power shaft 63, a rocking member 133 connected to the speed change gear shaft 17 through a one-way clutch 136, and a transmission link 132 mounted for pivotal motion on the driving link 131 by a first pivot shaft 134 which forms a first pivotally supporting portion and mounted for pivotal motion on the rocking member 133 by a second pivot shaft 135 which forms a second pivotally supporting portion.

The driving link 131 has a first coupling portion 131*a* having a ring-like shape, and a bifurcated second coupling portion 131*b* connecting to the first coupling portion 131*a* and having a pair of plate portions 131*b*1. The transmission link 132 includes a pair of plates 132*c* connected at end portions 132*a* thereof to each other in a spaced relationship by a predetermined distance from each other by a rivet 137. The rocking member 133 has a first coupling portion 133*a* disposed between the two plates 132*cd* of the transmission link 132, and a second coupling portion 133*b* of a ring-like shape connecting to the first coupling portion 133*a*.

The driving link 131 is supported at the first coupling portion 131*a* thereof for rotation on an outer periphery of a eccentric ring 138, which is spline-coupled for integral rotation to the input power shaft 63, through a slide bearing 139 such that it is mounted eccentrically for pivotal motion on the input power shaft 63. The axis of rotation of the eccentric ring 138, that is, the center axis of the driving link 131, is eccentric by a predetermined amount with respect to the axis of rotation of the input power shaft 63. A plurality of, for example, four, oil grooves 131*c* are formed in an equidistantly spaced relationship from each other in a circumferential direction on the first coupling portion 131 a such that they extend in diametrical directions as shown in FIGS. 11 and 12, and lubricating oil in the case 61 is supplied to the slide bearing 139 through the oil grooves 131*c*.

The transmission link 132 is supported for pivotal motion on the first pivot shaft 134, which is secured to and supported on the two plate portions 131*b*1 of the second coupling portion 131*b*, through a needle bearing 140 disposed between the two plate portions 131*b*1. The needle bearing 140 includes an inner race 140*a* fitted on an outer periphery of the first pivot shaft 134, an outer race 140*b* disposed outwardly in a diametrical direction of the inner race 140*a* and coupled, in a socket-and-spigot joint manner, to holes formed in the end portions 132*a* of the plates 132*c*, and a large number of needles 140*c* disposed between the inner race 140*a* and the outer race 140*b*.

Movements of the needles 140*c* in then axial directions are restricted by a pair of thrust washers 143 disposed adjacent to the opposite ends of the needle bearing 140, and the needles 140*c* are disposed with no gap left therebetween. Therefore, no retainer is required. A plurality of oil holes 140*c*1 are formed in a spaced relationship from each other in a circumferential direction, that is, in the present embodiment, four holes 140*d* are formed in an equidistantly spaced relationship from each other in a circumferential direction, in the outer race 140*b*.

The transmission link 132 is mounted for pivotal motion on the rocking member 133 as the first coupling portion 133*a* of the rocking member 133 is supported for rotation through a bearing formed from a needle bearing 141 by the second pivot shaft 135. The needle bearing 141 includes a large number of needles 141 a disposed on an outer periphery of the second pivot shaft 135 and surrounded and held by the first coupling portion 133*a* of the rocking member 133. Movements of the needles 141*a* in their axial directions are restricted by a pair of thrust washers 144 disposed adjacent to the opposite ends of the needles 141*a*, and the needles 140*c* are disposed without a gap left therebetween. Therefore, the needle bearing 141 does not have a retainer similarly to the needle bearing 140. A plurality of, for example, three, oil grooves 133c are formed in a spaced relationship from each other in a circumferential direction on each of the opposite side faces of the first coupling portion 133a such that they extend in diametrical directions as shown in FIG. 12. Lubricating oil in the case 61 is supplied to the needle bearing 141 through the oil grooves 133c.

Figure 21:
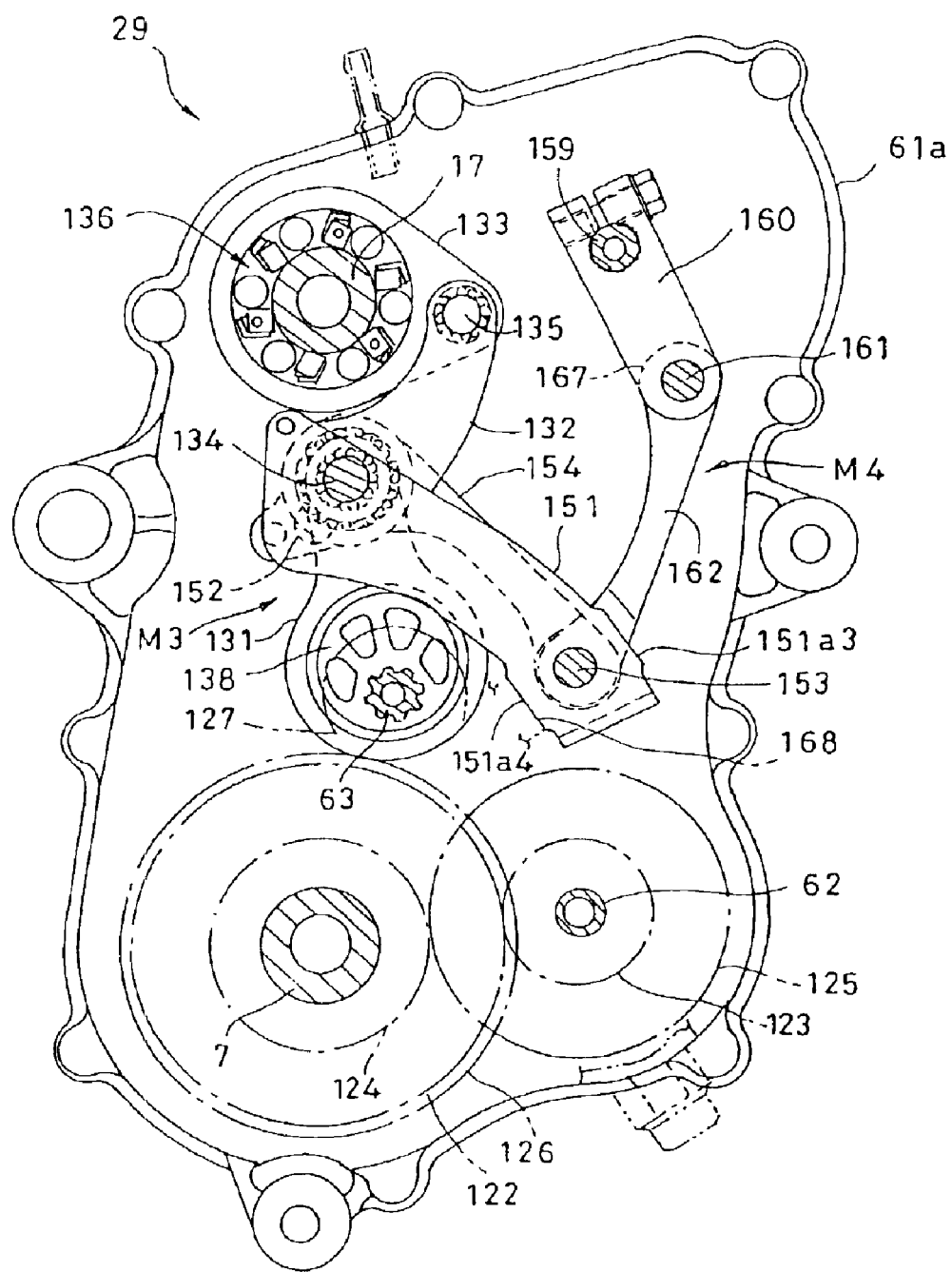
FIG. 21 is a right side elevational view similar to FIG. 9 but in a state wherein the non-stage speed change gear apparatus exhibits a minimum change gear ratio.

The locking member 133 is connected at the second coupling portion 133b thereof to the speed change gear shaft 17 through the one-way clutch 136 which transmits only torque which rotates the speed change gear shaft 17 in the forward direction AO. Accordingly, the one-way 37 clutch 136 transmits torque from the rocking member 133 to the speed change gear shaft 17 only when the rocking member 133 rocks in the forward direction AO at an angular velocity (refer to FIG. 21) in the forwardly direction AO of the speed change gear shaft 17, that is, at an angular velocity higher than the speed of rotation of the speed change gear shaft 17.

As shown in FIG. 8, the four link units U1 to U4 are disposed at equal distances in the axial direction which is also the bicycle widthwise direction) on the input power shaft 63 and the speed change gear shaft 17. More particularly, two ring-like collars 146 for keeping the distances between the adjacent link units U2 and U3; U3 and U4 are fitted on the input power shaft 63 sidewardly of the first coupling portions 131a of the driving links 131. The distance between the adjacent link units U1 and U2 in the proximity of the right end portion of the input power shaft 63 is held by the third driven gear wheel 127 disposed between the two link units U1 and U2.

In this manner, in the non-stage transmission apparatus 29 of the present embodiment, in order to minimize the length of the idle shaft 62 in the bicycle widthwise direction and reduce the weight and the size of the second driven gear wheel 124 and the third driving gear wheel 126 mounted on the crankshaft 7, the third driven gear wheel 127 for meshing with the third driving gear wheel 126 is mounted on the input power shaft 63 between the right end link unit U1 and the link unit U2 neighboring with the link unit U2.

Further, referring to FIGS. 8 and 9, the driving link 131 of the right end link unit U1 is disposed between the first driving gear wheel 122 and the third driving gear wheel 126 in the bicycle widthwise direction and besides is disposed at a position at which it can overlap with the first driving gear wheel 122 and the third driving gear wheel 126 in a diametrical direction of the crankshaft 7 by back and forth movements of the driving link 131.

Meanwhile, three ring-shaped collars as spacers which are members for keeping the distances between the adjacent link units U1 and U2; U2 and U3; U3 and U4 are fitted on the speed change gear shaft 17 sidewardly of the second coupling portion 133b of the rocking member 133.

The driving links 131 of the four link units U1 to U4 are mounted for pivotal motion with different phases from each other on the input power shaft 63 as shown in FIGS. 13(A)–(D). In the present embodiment, the driving links 131 are mounted for pivotal motion on the input power shaft 63 such that the axes of rotation of all of the driving links 131 are distributed at equal angular distances of 90°. It is to be noted that, in FIGS. 13(A)–(D), a third pivot shaft 153, a support shaft 159, a fourth pivot shaft 161 and an intermediate link 162 when a speed change link 154 hereafter described occupies a minimum gear ratio position thereof are shown.

It is to be noted that, as shown FIG. 8, the opposite end sides of the link units U1 to U4 in the axial direction of the eccentric ring 138 and the slide bearing 139 are covered with a pair of disk-shaped cover plates 149 spline-coupled to the input power shaft 63. The cover plates 149 are held from movement in an axial direction on the input power shaft 63 by the collars 146 and 148 and the third driven gear wheel 127.

Figure 14:
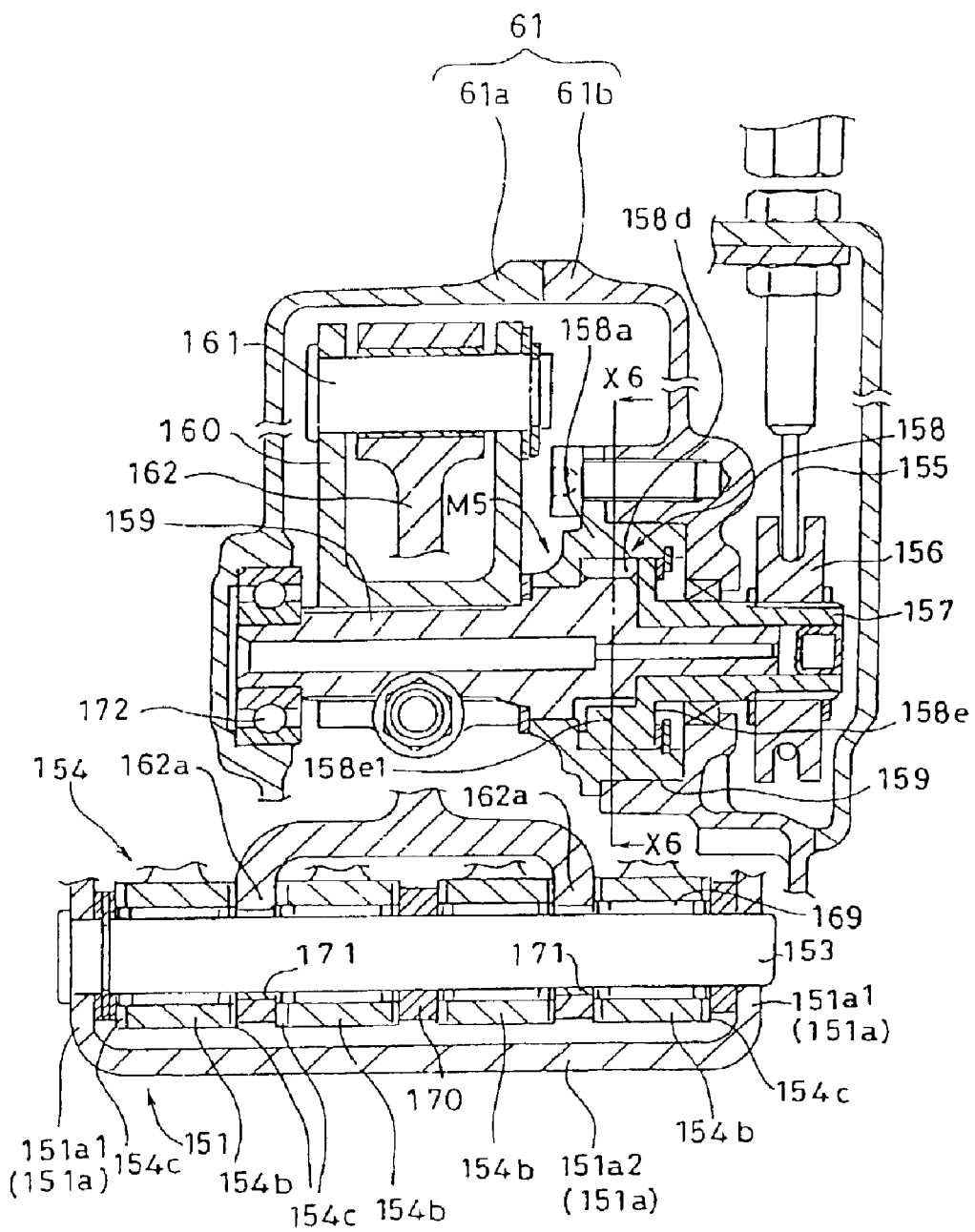
FIG. 14 is a sectional view taken along line X3—X3 and line X5—X5 of FIG. 9.

Referring to FIGS. 8, 9 and 14, a support member 151 supported for pivotal motion on the two case portions 61a and 61b through bearings 150 and the speed change link 154 mounted for pivotal motion on the link units U1 to U4 by the first pivot shaft 134 and mounted for pivotal motion on the support member 151 by tie third pivot shaft 153 which forms a third pivotally supporting portion are provided.

The speed changing operation mechanism M4 further includes a drum 156 to which all end portion of an operation wire 155 connected to the speed change lever described hereinabove is fastened, an operation shaft 157 which rotates integrally with the drum 156, a support shaft 159 connected to the operation shaft 157 by a dowel, a lever 160 which pivots integrally wit, the support shaft 159, and an intermediate link 162 mounted for pivotal motion on the support member 151 by the third pivot shaft 153 and mounted for pivotal motion oil the fourth pivot shaft lever 160 which forms a fourth pivotally supporting portion.

Referring to FIGS. 8, 9, 11 and 12, the speed change link 154 is mounted for pivotal motion by the first pivot shaft 134 with a ring-shaped end portion 154a thereof supported for pivotal motion on an outer periphery of the needle bearing 140 through a needle bearing 163 disposed in a sandwiched manner between the two plates 132e of the transmission link 132. Tile needle bearing 163 includes a large number of needles 163a disposed on an outer periphery of the outer race 140b and surrounded and held by the end portion 154a. Therefore, the two stages of the needle bearings 140 and 163 disposed in series in a diametrical direction with respect to the first pivot shaft 134 is disposed between the two plate portions 131b1 of the driving link 131. Movements of the needles 163a in their axial directions are restricted by a pair of thrust washers 164 disposed adjacent to the opposite ends of the needles 163a, and the needles are arranged with no gap left therebetween. Therefore, the needle bearing 163 does not include a retailer similarly to the needle bearing 140.

As shown in FIGS. 11 and 12, a plurality of oil grooves 154c are provided in a spaced relationship from each other in a circumferential direction, in the present embodiment, four oil grooves 154c are provided in an equally spaced relationship from each other in a circumferential direction, on each of the opposite side faces of the end portion 154a. Lubricating oil filled in the case 61 is supplied to the needle bearing 163 past the oil grooves 154c and further supplied to the needle bearing 140 past the oil holes 140d of the outer race 140b. It is to be noted that the right case portion 61b has a drain bolt 166 provided thereon for discharging the lubricating oil in a breathier pipe 165 and the case 61 as shown in FIG. 9.

Referring to FIGS. 8, 9 and 14, the support member 151 includes a support link 151a formed from a plate member bent in a U-shape, and a connecting shaft 151b coupled to the opposite end portions of the support link 151a and serving as a spacer for keeping the distance between the opposite end portions of the support link 151a in the bicycle widthwise direction. The support link 151a has a pair of side portions 151a1 extending in parallel to each other and opposing to each other in the bicycle widthwise direction, and a connecting portion 151a2 connecting the side portions 151a1 to each other.

The support member 151 is supported for pivotal motion on the case 61 since a center shaft 152 supported on the bearings 150 held by the case portions 61a and 61b is securely mounted thereon. Further, a pair of contacting faces 151a3 and 151a4 for contacting with first and second stoppers 167 and 168 (refer to FIG. 9) formed in a projecting manner on an inner face of the right case portion 61b, respectively, are formed on the right side portion 151a1 which is one of the side portions of the support link 151a. The first and second stoppers 167 and 168 define a minimum change gear ratio position and a maximum change gear ratio position of the speed change link 154, respectively.

Referring to FIG. 14, the third pivot shift 153 is secured to and supported by the opposite side portions 151a1 of the support member 151 in the proximity of the connecting portion 151a2 across the opposite side portions 151a1. The four speed change links 154 individually mounted at the end portions 154a thereof for pivotal motion on the four link units U1 to U4 are mounted for pivotal motion on the support members 151 as they are individually mounted at ring-shaped base end portions 154b thereof for pivotal motion on the third pivot shaft 153 through needle bearings 169 each having a large number of needles 169a. A plurality of oil grooves 154c are provided in a spaced relationship from each other in a circumferential direction, in the present embodiment, four oil grooves 154c are provided in an equally spaced relationship in a circumferential direction, on each of the opposite side faces of the base end portions 154b. Lubricating oil filled in the case 61 is supplied to the needle bearings 169 through the oil grooves 154c.

The speed change links 154 are disposed in an equally spaced relationship from each other in the axial direction (bicycle widthwise direction) on the third pivot shaft 153, and to this end, a collar 170 and the intermediate link 162 are used. In particular, the collar 170 serving as a spacer is disposed between the speed change links 154 which are positioned centrally and neighbor with each other (those speed change links 154 are mounted for pivotal motion on the link units U2 and U3). Further, the opposite end portions 162a of the bifurcated intermediate link 162 are supported for pivotal motion oil the third pivot shaft 153 through plain bearings 171 between the speed change links 154 at the opposite end portions (those speed change links 154 are mounted for pivotal motion on the link units U1 to U4) and the speed change links 154 which neighbor with the former speed change links 154. Therefore, the opposite end portions 162a disposed between the side portions 151a1 of the support member 151 are utilized as spacers having a function similar to that of the collar 170.

Figure 15:
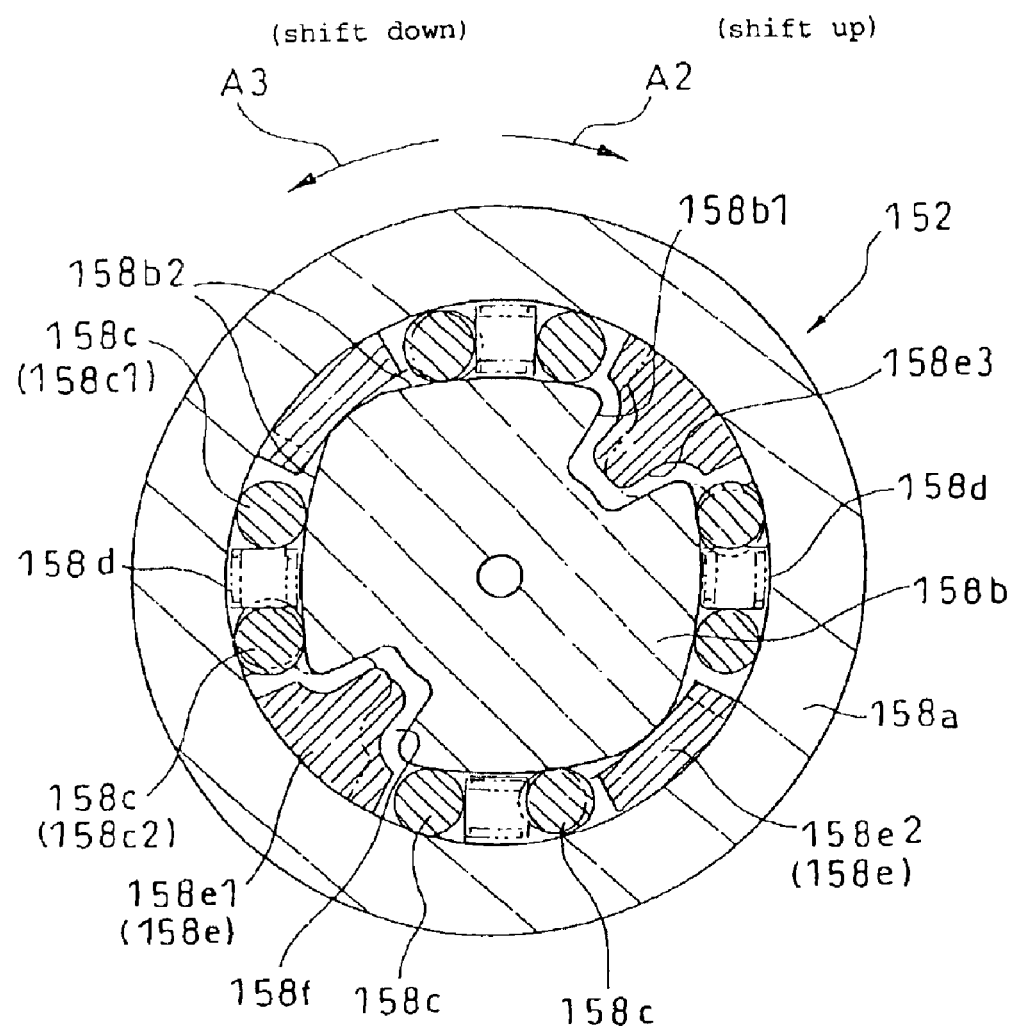
FIG. 15 is a sectional view taken along line X6—X6 of FIG. 14.

Referring to FIGS. 14 and 15, the support shift 159 is supported at an end thereof for pivotal motion on the left case portion 61a through a bearing 172. The other end of the support shaft 159 is held on the right case portion 61b through a two-way clutch 158 for preventing a component of driving force (refer to FIGS. 20(A) and (B)) from the input power shaft 63, which acts upon the driving links 131 of the link units U1 to U4, from rotating the drum 156 through the first pivot shaft 134, speed change links 154, support member 151, third pivot shaft 153, intermediate link 162, lever 160 and support shaft 159.

The two-way clutch 158 includes an outer race 158a secured to the right case portion 61b, an inner race 158b mounted for integral rotation with the support shaft 159, an even number of, eight in the present embodiment, rollers 158c disposed in an accommodation space between the two races 158a and 158b in a diametrical direction, clutch springs 158d each formed from a compression spring and each disposed in the accommodation space between a pair of ones of the rollers 158c in a circumferential direction, and a retainer 158e disposed between two ones of the rollers 158c in a circumferential direction on the opposite sides to the clutch springs 158d.

The retainer 158e formed integrally on the operation shaft 157 is brought into contact with the rollers 158c when the operation shaft 157 is rotated in a rotational direction A2 (hereinafter referred to as up direction A2) for shifting up and in another rotational direction A3 (hereinafter referred to as down direction A3) for shifting down. The retainer 158c has a pair of first retaining portions 158e1 each having an engaging portion formed from a projection 158e3 which is engageable with an engaging portion formed from a recessed portion 158b1 formed on the inner race 158b in an opposing relationship in a diametrical direction of the operation shaft 157, and second retaining portions 158e2 positioned between the two first retaining portions 158e1 in a circumferential direction.

A gap 158f for allowing relative rotation between the retainer 158e and the inner race 158b is formed 47 between the recessed portions 158b1 and the projections 158e3. Upon relative rotation until the recessed portion 158b1 and the projection 158e3 are brought into engagement with each other, the first and second retaining portions 158e1 and 158e2 press the rollers 158c against the resilient force of the clutch springs 158d to place the rollers 158c into a state wherein they do not bite between the outer race 158a and the inner race 158b (that is, to lock them), that is, into an unlocked state.

A cam face 158b2 is formed on an outer periphery of the inner race 158b. The cam face 158b2 operates the roller 158c1 on the up direction A2 side from between a pair of rollers 158c which oppose to each other with a clutch spring 158d interposed therebetween so that it permits rotation of the support shaft 159 in the up direction A2 but prevents rotation of the support shaft 159 in the down direction A3. Further, the cam face 158b2 is formed such that the width thereof in a diametrical direction of the accommodation space varies in a circumferential direction so that the roller 158c2 oil the down direction A3 side permits rotation of the support shaft 159 in the down direction A3 but prevents rotation of the support shaft 159 in the up direction A2.

Therefore, if the operating force applied to the speed change lever rotates the drum 156 in the up direction A2 through the operation wire 155, then the first and second retaining portions 158e1 and 158e2 rotate relative to each other in the up direction A2 as indicated by alternate long and two short dashes lines in FIG. 15 and are brought into contact with the roller 158c2 to place the roller 158c2 into an unlocking state, whereafter the projection 158e3 and the recessed portion 158b1 are brought into engagement with each other to engage the first retaining portion 158e1 with the inner race 158b so that the inner race 158b is rotated in the up direction A2 together with the support shaft 159.

On the contrary, if the operating force rotates the drum 156 in the down direction A3 through the operation wire 155, then the first and second retaining portions 158e1 and 158e2 are rotated relatively in the down direction A3 and brought into contact with the roller 158c1 to place the roller 158c1 into an unlocking state, whereafter the projection 158e3 and the recessed portion 158b1 are brought into engagement with each other to engage the first retaining portions 158e1 with the inner race 158b so that the inner race 158b is rotated in the down direction A3 together with the support shaft 159.

Incidentally, referring to FIG. 9, if notice is taken of any of the link units U1 to U4 which transmits, during rotation of the crankshaft 7, torque to the speed change gear shaft 17 through the rocking member 133 and the one-way clutch 136 to drive the speed change gear shaft 17 to rotate, the driving force from the input power shaft 63 which move the driving links 131 of the link units U1 to U4 back and forth acts upon the rocking member 133 through the transmission link 132 and further acts toward the third pivot shaft 153 through the speed change links 154.

Torque T which is exerted on the support shaft 159 through a link by a component F of the driving force acting upon the third pivot shaft 153 has a magnitude and a direction corresponding to a variation of the driving force acting upon the driving link 131 of that one of the link units U1 to U4 which drives the speed change gear shaft 17 to rotate as seen in FIGS. 20(A) and (B), and tends to rotate the support shaft 159 through the fourth ink and the lever 160. It is to be noted that, in FIGS. 20(A) and (B), reference characters U1 to U4 denote each a link unit which drives the speed change gear shaft 17 to rotate, and reference character FO denotes a value for indicating a standard for the magnitude of the component F of force.

If, at this time, operating force does not act upon the retainer 158e through the operation wire 155, then even if the torque T tends to rotate the support shaft 159 in any of the up direction A2 and the down direction A3, the rollers 158c are placed into a locking state and the support shaft 159 does not rotate. On the other hand, if the torque T acts to tend to rotate the support shaft 159 in the up direction A2 (down direction A3) while operating force for shifting up (shifting down: in the following description, description corresponding to shifting down is given in a parenthesis) acts upon the retainer 158e, then the torque T acts as assisting force and the operating force is moderated. On the other hand, if the component F of force acts to tend to rotate the support shaft 159 in the down direction A3 (up L direction A2), the rollers 158c are brought in to a locking state and the support shaft 159 is prevented from rotating in the down direction A3 (up direction A2).

Therefore, the operation shaft 157, two-way clutch 158, support shaft 159, lever 160, fourth pivot shaft 161 and intermediate link 162 form a transmitting mechanism M5 for transmitting operating force by the operation lever to the third pivot shaft 153.

Figure 16:
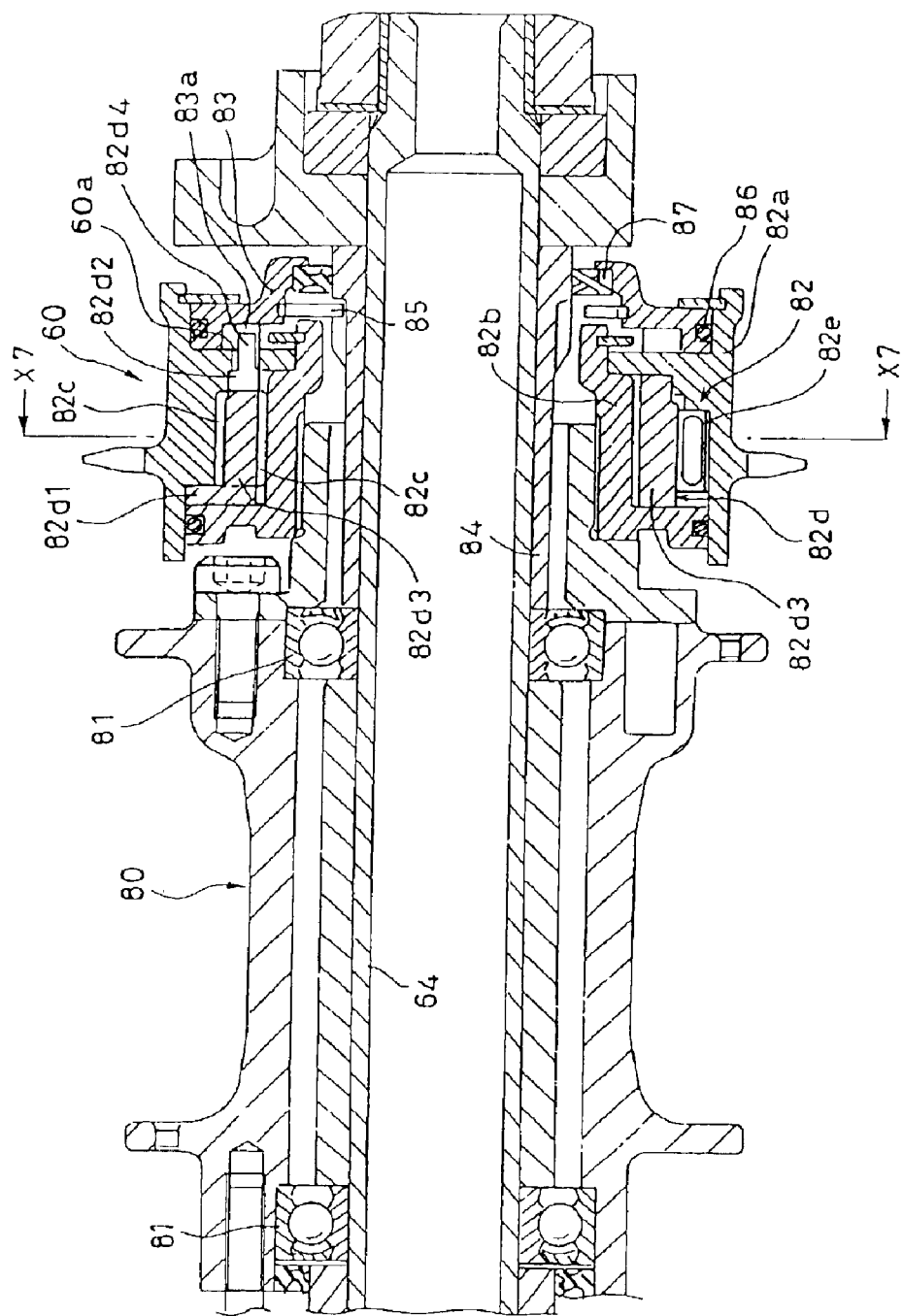
FIG. 16 is a sectional view of a rear hub and a driven sprocket wheel of the bicycle of FIG. 7 taken along line X—X of FIG. 17.
Figure 17:
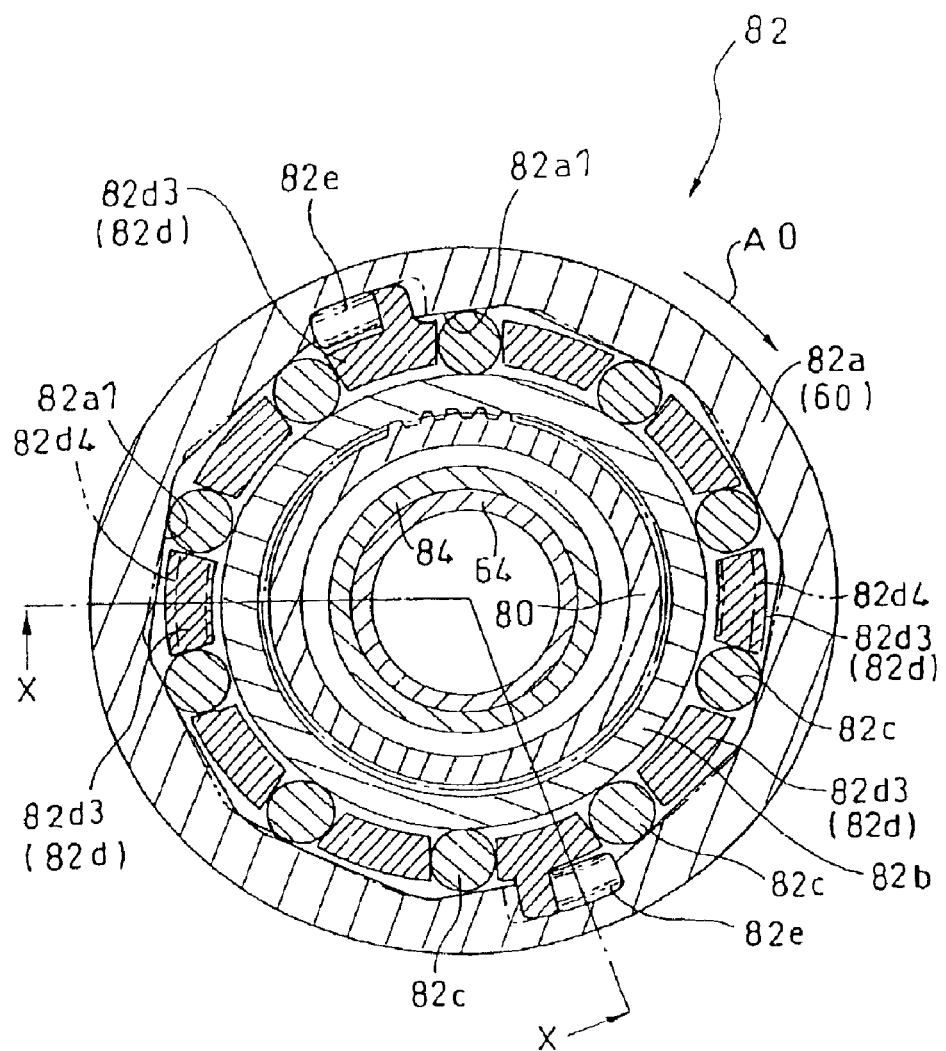
FIG. 17 is a sectional view taken along line X7—X7 of FIG. 16.

Description is given of a rear hub 80 and the driven sprocket wheel 60 with reference to FIGS. 16 and 17. The rear hub 80 which is supported for rotation on the rear wheel axle 64 through a bearing 81 has the driven sprocket wheel 60 provided at a right end portion thereof through a one-way clutch 82. A right end portion of the one-way clutch 82 is covered with a cover 83 provided between the driven sprocket wheel 60 and the rear wheel axle 64.

The one-way clutch 82 includes an outer race 82a formed from the driven sprocket wheel 60, an inner race 82b coupled to the rear hub 80 by a screw, a plurality of rollers 82c disposed in an accommodation space in a diametrical direction between the two races 82a and 82b, a retainer 82d for keeping the distances between the plurality of rollers 82c in a circumferential direction, and clutch springs 82e each formed from a compression spring and disposed between the outer race 82a and the retainer 82d.

The retainer 82d has a positioning portion composed of an annular large diameter ring 82d1 and an annular small diameter ring 82d2 spaced from each other in the bicycle widthwise direction, retaining portions 82d3 connected to the two rings 82d1 and 82d2 and extending in the bicycle widthwise direction until it is positioned between the rollers 82c which neighbor with each other in a circumferential direction, and projections 82d4 formed integrally on a pair of ones of the retaining portions 82d3 which are positioned in an opposing relationship to each other in a diametrical direction and extending through and projecting rightwardly from elongated holes 60a formed in the driven sprocket wheel 60. When the projections 82d4 engage with engaging portions formed from recessed portions 83a formed on the cover 83, the cover 83 and the retainer 82d can rotate integrally with each other.

The clutch springs 82e are disposed between pairs of ones of the retaining portions 82d3 which are positioned in an opposing relationship to each other in a diametrical direction and the outer race 82a and bias the pair of retaining portions 82d3 in the forward direction AO with the resilient force thereof.

The cover 83 is biased outwardly in a diametrical direction by resilient force of an annular friction spring 85 formed from a wire member secured to a wheel tube 84 fitted on and secured to the rear wheel axle 64. Further, an outer periphery of the cover 83 and the outer race 82a are sealed with a seal 86, and an inner periphery of the cover 83 and the wheel tube 84 are sealed by another seal 86.

The set load of the friction spring 85 is set to a magnitude with which frictional force which does not allow relative rotation between the rear wheel axle 64 and the retainer 82d is produced between the cover 83 and the friction spring 85 so that, when the one-way clutch 82 in a disconnecting state enters a connecting state, the clutch springs 82e are compressed by the forwardly rotating driven sprocket wheel 60 to place the rollers 82c into a locking state (indicated by alternate long and two short dashes lines in FIG. 17) between a cam face 82a1 formed on an inner circumferential face of the outer race 82a (driven sprocket wheel 60) and the inner race 82b and besides to a magnitude with which, when the one-way clutch 82 is brought into a connecting state, the cover 83 can rotate together with the retainer 82d, driven sprocket wheel 60 (outer race 82a) and inner race 82b.

When the driven sprocket wheel 60 rotates in the forward direction A0, the rollers 82c are placed into a locking state by such a one-way clutch 82 as described above so that the driven sprocket wheel 60 and the rear hub 80 rotate integrally with each other. Further, when the driver stops its treadling of the pedals 9 during traveling of the bicycle, or when the bicycle is advanced in a state wherein the driver gets off the bicycle, the driven sprocket wheel is rotated in a direction opposite to the forward direction AO by an amount corresponding to a slack of the chain by the resilient force of the clutch springs 82e and the rollers 82c is brought into an unlocking state to place the one-way clutch 82 into a disconnecting state. Thus, in a state wherein the driven sprocket wheel 60 stops, only the rear wheel WR, that is, only the rear hub 80, rotates in the forward direction A0. Further, for example, when the bicycle is moved backwardly in a state wherein the driver gets off the bicycle, the rollers 82c are brought into an unlocking state shown in FIG. 17 by the resilient force of the friction spring 85 and the one-way clutch 82 is brought into a disconnecting state. Consequently, while the driven sprocket wheel 60 is in a stopping state, only the rear wheel WR, that is, only the rear hub 80, rotates in the reverse direction.

Figure 13A:
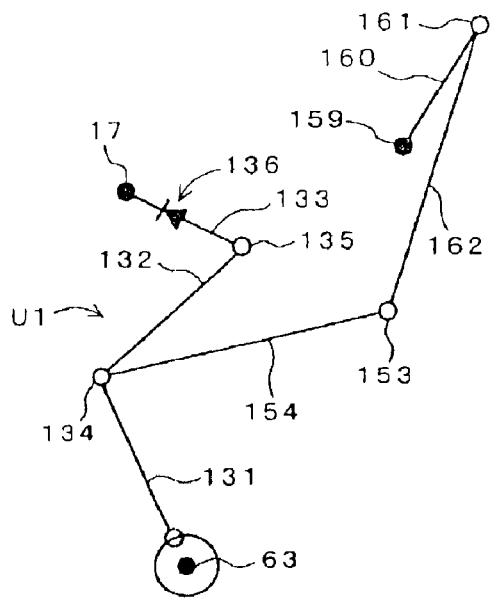
FIGS. 13(A)–(D) are schematic views illustrating pivotally mounting forms on an input power shaft of four link units which compose the speed change gear mechanism of the non-stage speed change gear apparatus of FIG. 7.
Figure 13B:
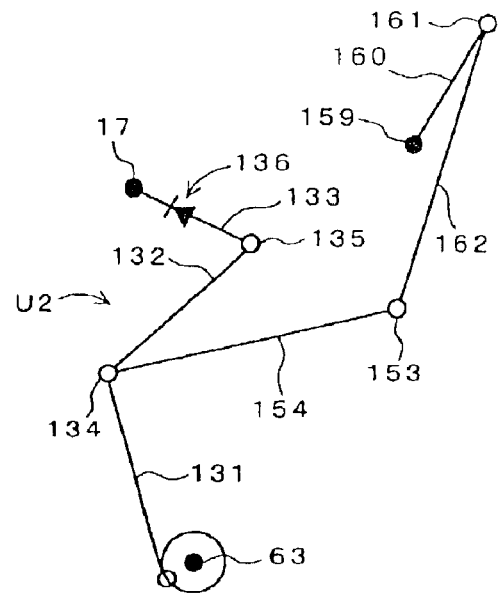
Figure 13C:
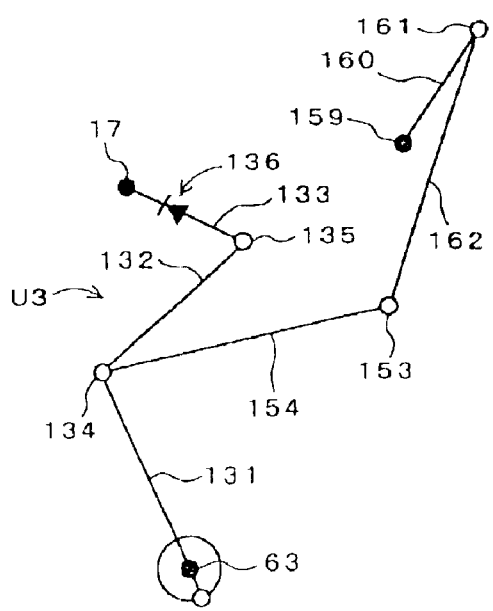
Figure 13D:
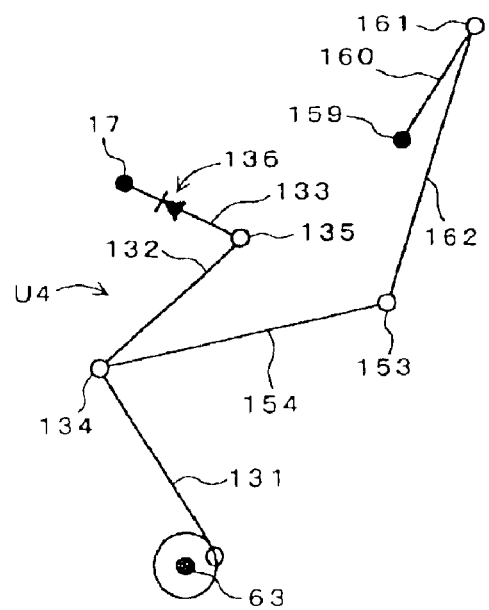
Figure 18A:
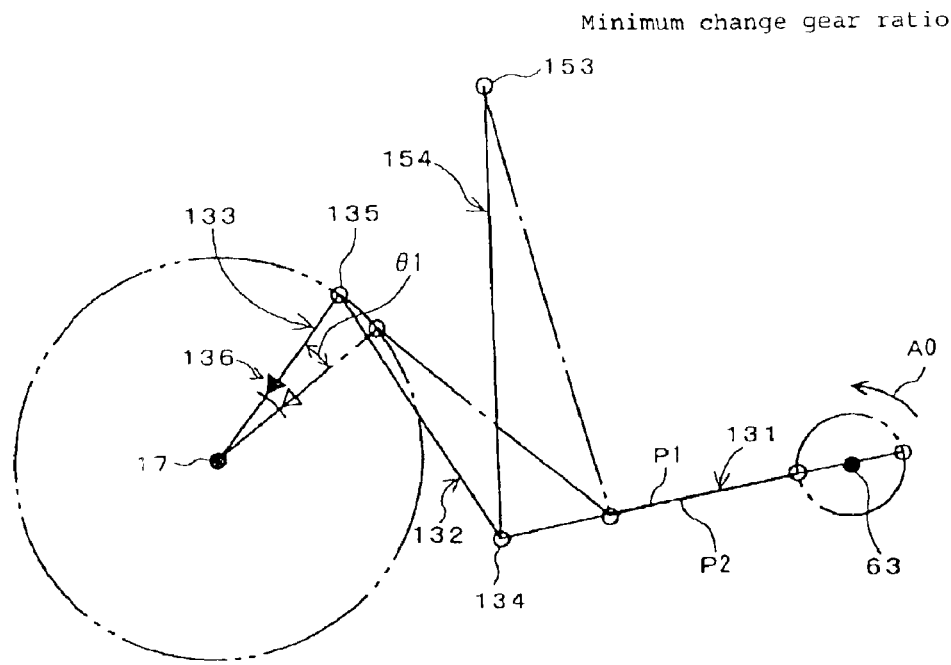

Subsequently, action of the non-stage transmission apparatus 29 is described. As shown in FIG. 9, when the bicycle is traveling while the non-stage transmission apparatus 29 is in a minimum change gear ratio state, the position of the third pivot shaft 153 is fixed with the support member 151 contacting with a first stopper 167. At this time, while the input power shaft 63 make one rotation, the driving links 131 are moved back and forth between the two positions P1 and P2 shown in FIG. 18(A) at each rotation of the input power shaft 63 by the driving force of the input power shaft 63 as shown in FIG. 18(A), and the link units U1 to U4 successively rock the rocking member 133 over a rocking angular range 81. Then, since the link units U1 to U4 are connected to the speed change gear shaft 17 through the one-way clutch 136, while the input power shaft 63 makes one rotation in the non-stage transmission apparatus 29 having the four link units U1 to U4, the speed change gear shaft 17 is successively driven to rotate by that one of the link units U1 to U4 which drives the speed change gear shaft 17 to rotate at a maximum angular velocity (rotational speed) in the forward direction AO as shown in FIG. 13(A).

Figure 19A:
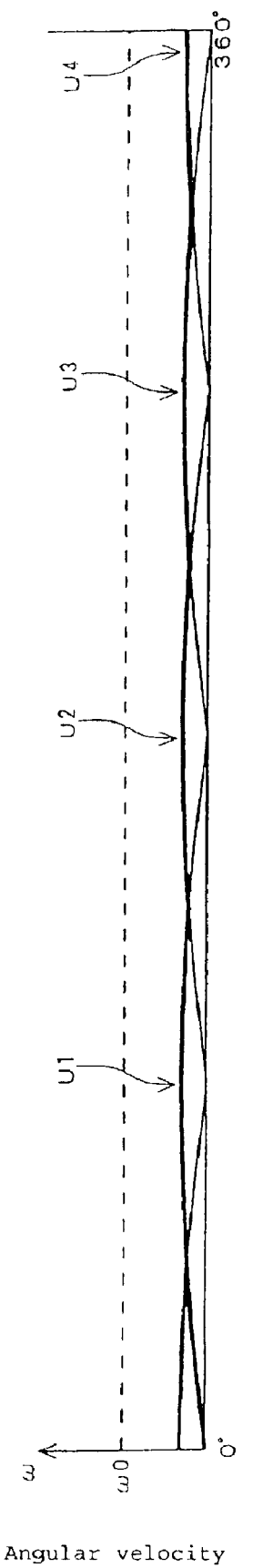
Figure 19B:
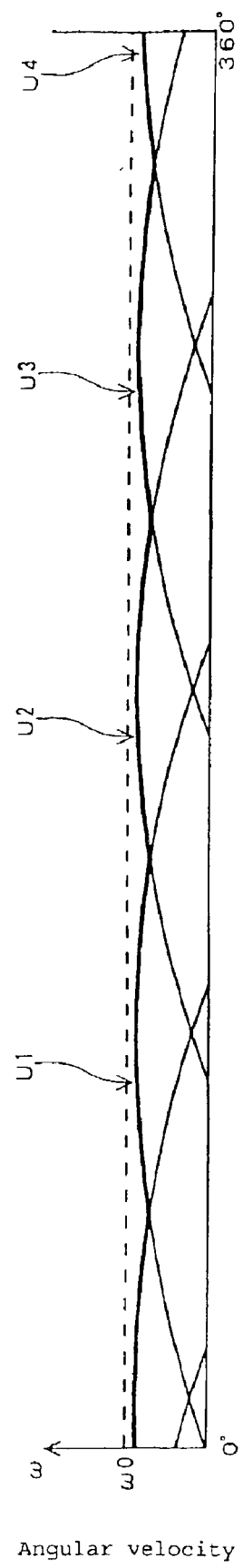

In this instance, at a timing at which rotation of the speed change gear shaft 17 exhibits the highest speed, the speed of rotation of the input power shaft 63 is in the minimum by the unequal speed rotation transmitting mechanism M2 which uses non-circular gear wheels including the bracket 26 and the third driven gear wheel 127. However, at another timing at which transition from a state wherein, for example, the link unit U1 drives the speed change gear shaft 17 to another state wherein the link unit U2 having a phase of 90° with respect to the link unit U1 drives the speed change gear shaft 17 occurs, that is, at a timing at which the speed of rotation of the speed change gear shaft 17 becomes minimum, the speed of rotation of the input power shaft 63 becomes maximum by the unequal speed rotation transmitting mechanism M2. Consequently, the width of variation of the speed of rotation of the speed change gear shaft 17 is decreased and the pulsating motion is reduced. It is to be noted that, in FIGS. 19(A) and (B), each of reference characters U1 to U4 indicates a link unit which drives the speed change gear shaft 17 to rotate, and reference character ω0 denotes a value for indicating a standard for the magnitude of the angular velocity ω of the speed change gear shaft 17.

If the driver operates the speed change lever for shifting up from the operation state with the minimum change gear ratio, then the operating force rotates the retainer 158e of the two-way clutch 158 (refer to FIG. 15) in the up direction A2 through the operation wire 155, drum 156 and operation shaft 157. At this time, as shown in FIG. 20(A), the torque T generated on the support shaft 159 through a link by the component F (component of force on the positive side in FIGS. 20(A) and (B)) of the driving force when the speed change gear shaft 17 is accelerated by the driving force from the input power shaft 63 to each of the link units U1 to U4 acts as assisting force upon the support shaft 159 through the speed change link 154, intermediate link 162 and lever 160. Then, by the rotation of the support shaft 159, the third pivot shaft 153 moves along a circular speed change locus centered at the center shaft 152 supporting the support member 151 toward the position for the maximum change gear ratio shown in FIG. 21 so that the rear wheel WR is driven to rotate at a higher change gear ratio.

Figure 18B:
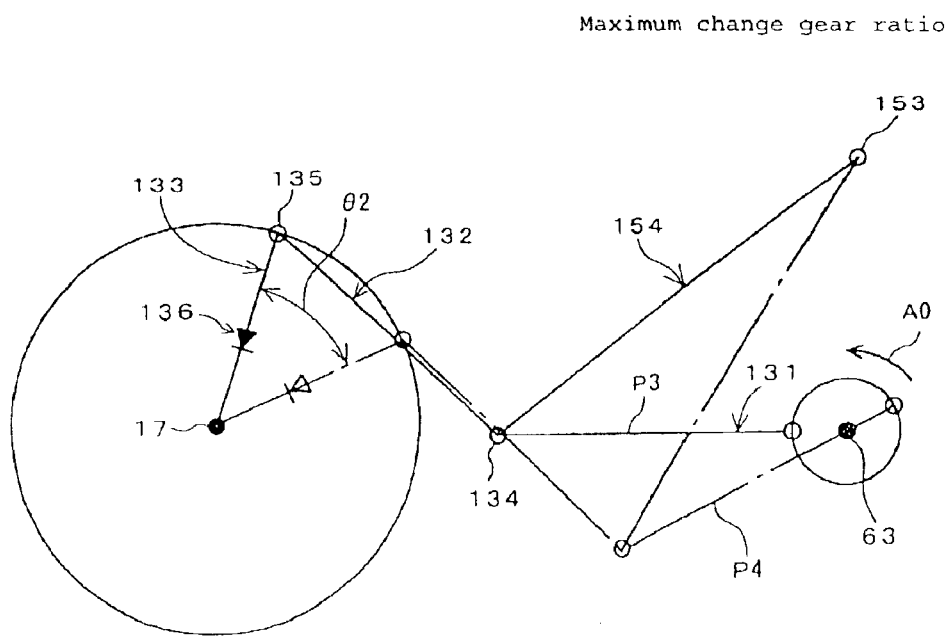

Referring to FIG. 18(B), vile the input power shaft 63 makes one rotation when the speed change link 154 and the third pivot shaft 153 are in a maximum change gear ratio state (refer to FIG. 21), each of the driving links 131 moves back aid forth between two positions P3 and P4 shown in FIG. 18(B) at each rotation of the input power shaft 63, and each of the link units U1 to U4 rocks the rocking member 133 over a rocking angular range θ2 greater than the rocking angular range θ1 for the minimum change gear ratio. Then, while the input power shaft 63 makes one rotation, the speed change gear shaft 17 is successively driven to rotate by one of the link units U1 to U4 which drives the speed change gear shaft 17 to rotate at the maximum angular speed (rotational speed) in the forward direction A0. Also in this instance, similarly as in the case of the minimum change gear ratio described above, the width of variation of the speed of rotation of the speed change gear shaft 17 is decreased by the unequal speed rotation transmitting mechanism M2 and the pulsating operation is reduced.

If the driver operates the operation lever for shifting down from the operation condition at the maximum change gear ratio, then the operating force rotates the retainer 158e of the two-way clutch 158 (refer to FIG. 14) in the down direction A3 through the operation wire 155, drum 156 and operation shaft 157. At this time, as shown in FIG. 20(B), the torque F generated on the support shaft 159 through the link by the component F (component of force on the negative side in FIGS. 20(A) and (B)) of the driving force in the direction in which the speed change gear shaft 17 is decelerated by the driving force from the input power shaft 63 to each of the link units U1 to U4 acts as assisting force upon the support shaft 159. Then, by the rotation of the support shaft 159, the third pivot shaft 153 moves along the speed change locus from the position for the maximum change gear ratio to toward the position for the minimum change gear ratio so that the rear wheel WR is driven to rotate at a lower change gear ratio.

Since the third pivot shaft 153 can occupy an arbitrary position between the position to the minimum change gear ratio and the position for the maximum change gear ratio in a non-stage manner by a speed changing operation of the speed changing operation mechanism M4 in this manner, rotation of the crankshaft 7 is transmitted at a speed changed in a non-stage manner to the rear wheel WR.

Next, the operation and effects of the embodiment having the configuration described above are described.

Since the speed changing mechanism M3 for connecting the input power shaft 63 driven to rotate by the crankshaft 7 and the speed change gear shaft 17 in a driving relationship therebetween is composed of the plurality of link units U1 to U4 which do not use a gear wheel, different from the prior art described hereinabove, generation of noise is suppressed and the speed changing mechanism M3 has a reduced weight. Further, since the input power shaft 63 and the speed change gear shaft 17 are connected in a driving relationship to each other by the link units U1 to U4 each composed of a plurality of links, the degree of freedom of the arrangement of the speed change gear shaft 17 with respect to the crankshaft 7 and hence to the bicycle body frame is increased. Therefore, also since the rear wheel WR is supported by the swing arm 23 which can be rocked in upward and downward directions, the speed change gear shaft 17 can be arranged in the proximity of the imaginary plane 11 including the rocking shaft 22 with respect to the bicycle body frame.

Since the speed increasing mechanism M1 is provided between the crankshaft 7 and the input power shaft 63, the period of pulsation in the speed of rotation of the speed change gear shaft 17 is shortened, and consequently, while increase of the weight and increase of the size are suppressed, such ail agreeable driving feeling that the driver little feels the pulsation of the speed of rotation call be achieved.

Further, since the unequal speed rotation transmitting mechanism M2 composed of the bracket 26 and the third driven gear wheel 127 which are both non-circular gear wheels are disposed between the crankshaft 7 and the input power shaft 63 such that the two gears 126 and 127 mesh with each other so that, at each change gear ratio, the speed of rotation of the input power shaft 63 may be minimum at a timing at which the speed of rotation of the speed change gear shaft 17 is maximum and the speed of rotation of the input power shaft 63 may be maximum at another timing at which the speed of rotation of the speed change gear shaft 17 is minimum, pulsation of the speed of rotation of the speed change gear shaft 17 can be further reduced.

Since the component F of the driving force transmitted through the speed change link 154 for driving the link units U1 to U4 is used as assisting force for the operating force for a speed changing operation by the transmitting mechanism M5 which transmits the operating force to the third pivot shaft 153, back and forth movements of the driving link 131 which is driven by driving force when the input power shaft 63 is driven to rotate by the crankshaft 7 are utilized to reduce the operating force for a speed changing operation which the driver treadles the pedals 9 to rotate the crankshaft 7.

Besides, since the two-way clutch 158 which prevents rotation of the support shaft 159 by force acting from the speed changing mechanism M3 side but permits rotation of the support shaft 159 by the operating force acting thereupon from the operation lever described hereinabove, a speed changing operation can be performed with certainty not only when the bicycle is in a stopping state but also when the bicycle is traveling.

Since the driving link 131 of the right end U1 which is one of the driving links 131 mounted for pivotal motion on the input power shaft 63 is disposed between the first driving gear wheel 122 and the third driving gear wheel 126 which are gear wheels individually composing a pair of speed increasing stages of the speed increasing mechanism M1 in the bicycle widthwise direction and besides is disposed at a position at which it can overlap with the first driving gear wheel 122 and the third driving gear wheel 126 in a diametrical direction of the crankshaft 7, the non-stage transmission apparatus 29 can be reduced in size in the bicycle widthwise direction, and besides the distance between the axes of the crankshaft 7 and the input power shaft 63 can be reduced. Also this can contribute to miniaturization of the non-stage transmission apparatus 29.

Further, since the third driven gear wheel 127 which is the final gear of the speed increasing mechanism M1 is mounted at a portion rather near to one end portion of the input power shaft 63 which is supported at the opposite ends thereof on the case 61, distortion of the input power shaft 63 by a load acting upon the input power shaft 63 from the third driving gear wheel 126 through the third driven gear wheel 127 cain be suppressed to the utmost. Further, since the third driven gear wheel 127 can be used as a spacer for the link units U1 to U4 disposed at an equally spaced relationship from each other on the input power shaft 63, the length of the input power shaft 63 in the bicycle widthwise direction can be suppressed and the non-stage transmission apparatus 29 can be miniaturized in the bicycle widthwise direction.

Since the needle bearings 140 and 163 are disposed in two stages in series in a diametrical direction on the first pivot shaft 134 in order to mount the driving links 131 and the transmission link 132 for pivotal motion relative to each other and mount the speed change links 154 on the link units U1 to U4 and the needle bearings 140 and 163 are formed as retainerless bearings, friction of the needle bearings 140 and 163 is reduced. Besides, since the widths of the needle bearings 140 and 163 and hence of the links 131, 132 and 154 in an axial direction of the first pivot shaft 134 can be reduced, the speed changing mechanism M3 and hence the non-stage transmission apparatus 29 can be miniaturized in the bicycle widthwise direction.

The third pivot shaft 153 on which the speed change link 154 is supported for pivotal motion is supported by the pair of side portions 151a1 of the support member 151 which are opposed to each other and extend in parallel to each other. Besides, since the side portions 151a1 are supported on the case 61, not only the load arising from operating force for a speed changing operation and acting upon each of the side portions 151a1 through the transmitting mechanism M5 and the third pivot shaft 153 is reduced, but also deformation or inclination of the side portions 151a1 is suppressed and besides reduction in weight can be anticipated. Further, since portions of the opposite side portions 151a1 in the proximity of portions at which the third pivot shaft 153 is supported are connected by the connecting portion 151a2 to raise the rigidity of the support member 151, deformation or inclination of the side portions 151a1 is further reduced.

Since the intermediate link 162 supported on the third pivot shaft 153 is utilized in addition to the collar 170 to keep the distance between adjacent ones of the speed change links 154 in order to arrange all of the speed change links 154 supported on the third pivot shaft 153 in an equally spaced relationship from each other in the bicycle widthwise direction, and similarly since the third driven gear wheel 127 is utilized in addition to the collars 146 to keep the distance between each adjacent ones of the link units U1 to U4 in order to arrange all of the link units U1 to U4 mounted for pivotal motion on the input power shaft 63, the number of collars used as spacers can be reduced and the widths of the support members 151 on which the third pivot shaft 153 is supported and the input power shaft 63 can be reduced. Consequently, the support member 151 and the input power shaft 63 and hence the non-stage transmission apparatus 29 can be miniaturized in the bicycle widthwise direction.

In the following, embodiments wherein part of the configuration of the embodiment described above is modified are described with regard to the modified configuration.

In the embodiment described above, the unequal speed rotation transmitting mechanism M2 is composed of non-circular gear wheels. However, the unequal speed rotation transmitting mechanism M2 may be composed of some other members which generate unequal speed rotation such as eccentric gear wheels. The speed increasing mechanism M1 may lave a plurality of speed increasing stages except 3 or one speed increasing stage. Further, the bicycle may be a bicycle other than a bicycle for downhill, or may be a two-wheeled vehicle or a three-wheeled vehicle.

While the support link 151a is composed of, in the embodiment described above, a single member which forms a pair of side portions 151a1 and a connecting portion 151a2, it may be composed of three separate members including a pair of side portions and a connecting portion and coupled to each other.

According to the present invention, the following effects are achieved.

According to the invention as set fourth in the claims, since the speed change gear shaft is not disposed coaxially with the crankshaft, the positions of the speed change gear and the crankshaft can be set freely in accordance with the configuration of the bicycle body.

According to the invention, the speed change gear shaft can be disposed in the proximity of the rocking shaft of the swing arm. Accordingly, different from an arrangement wherein the speed change gear shaft is disposed coaxially on the crankshaft, even if the rocking shaft is not arranged in the proximity of the crankshaft, fluttering of a chain for transmitting driving power to the rear wheel can be reduced without provision of a rear derailleur.

According to the invention, the fluttering of the chain caused by the rocking motion of the swing arm can be reduced when compared with an alternative arrangement wherein the speed change gear shaft is disposed rearwardly of the rocking According to the invention, the speed change gear and the gear wheel apparatus can be accommodated compactly in the case.

According to the invention, the degree of freedom in selection of the relative positions of the crankshaft and the speed change gear call be raised.

According to the invention, since the input power shaft driven to rotate by the crankshaft and the speed change gear shaft as an output power shaft are connected to each other by a link unit which does not use a gear wheel, generation of noise is suppressed and the speed change gear mechanism is reduced in weight.

According to the invention, since the input power shaft and the speed change gear shaft are connected to each other by a plurality of linkages, the degree of freedom in arrangement of the crankshaft and the speed change gear shaft is increased.

According to the invention, since the speed increasing mechanism is provided between the crankshaft and the input power shaft, the period of pulsation in the speed of rotation of the speed change gear shaft is reduced and tie width of the variation is decreased. Consequently, the pulsation is reduced by a simple structure while increase of the weight and increase of the size are suppressed and such an agreeable traveling performance that the driver little feels the pulsation of the speed of rotation can be realized.

According to the invention, since the unequal speed rotation transmitting mechanism is disposed between the crankshaft and the input power shaft, if gear wheels are combined so that, at each change gear ratio, the speed of rotation of the input power shaft may be minimum at a timing at which the speed of rotation of the speed change gear shaft is maximum and the speed of rotation of the input power shaft may be maximum at another timing at which the speed of rotation of the speed change gear shaft is minimum, then the pulsation of the speed of rotation of the speed change gear shaft can be further reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following

What is claimed is:

1. A bicycle with a speed change gear with multiple stages, comprising:
    a crankshaft for rotating an input shaft in order to input power to the bicycle; and
    a speed change gear shaft of said speed change gear provided separately from said input power shaft and said crankshaft and disposed in parallel to said input power shaft and said crankshaft;
    a swing arm for supporting a rear wheel thereon; and
    a rocking shaft for rockably supporting said swing arm on a main frame of a bicycle body, said rocking shaft being provided in parallel to an axle of said rear wheel, said rocking shaft and said speed change gear shaft being disposed in a neighboring relationship with each other, wherein said speed change gear shaft is disposed in a front portion of said bicycle body forwardly of said rocking shaft.

2. The bicycle with a speed change be according to claim 1, further comprising:
    a gear wheel apparatus for transmitting rotation of said crankshaft to said speed change gear; and
    a common case for supporting said gear wheel apparatus, said speed change gear and said crankshaft.

3. The bicycle with a speed change gear according to claim 1, wherein said speed change gear further comprises:
    at least one linkage connected eccentrically to said input power s aft in such a manner as to perform a rocking movement in response to a rotational angle of said input power shaft;
    a one-way clutch for connecting said linkage to said speed chain gear shaft to move said speed change gear shaft in a pulsating manner in one direction in an interlocking relationship with the rocking movement of said linkage; and
    speed changing operation means for adjusting the rocking angle of said linkage with respect to the rotational angle of said input power shaft to change the rotational angle of said speed change gear shaft with respect to the rotational angle of said input power shaft.

4. The bicycle with a speed change gear according to claim 3, further comprising a plurality of linkages, said linkages being connected in an angularly equally spaced relationship from each other in a circumferential direction to said input power shaft and perform rocking movements with different phases from each other in synchronism with rotation of said input power shaft.

5. The bicycle with a speed change gear according to claim 3, wherein said crankshaft and said input power shaft mesh with each other with a speed increasing mechanism interposed therebetween.

6. The bicycle with a speed change gear according to claim 3, wherein said crankshaft and said input power shaft mesh with each other with an unequal speed rotation transmitting mechanism interposed therebetween.

7. A bicycle with a speed change gear, comprising:
    a bicycle body having a pair of left and right mainframes;
    a treadling force transmitting apparatus for transmitting rotation of a crankshaft to the speed change gear; and
    a speed change gear shaft of said speed change gear provided separately from said crankshaft, disposed in parallel to said crankshaft and disposed in a front portion of said bicycle body forwardly of a rocking shaft,
    both sides of said transmitting apparatus being held by said pair of left and right main frames.

8. A bicycle with a speed change gear, comprising:
    a bicycle body having a pair of left and right mainframes;
    a treadling force transmitting apparatus for transmitting rotation of a crankshaft to the speed change gear;
    a speed change gear shaft of said speed change gear provided s partially from said crankshaft, disposed in parallel to said crankshaft and disposed in a front portion of said bicycle body forwardly of a rocking shaft; and
    a case covering said transmitting apparatus, the case being disposed on said pair of left and right main frames and supporting at least one of the crankshaft or the speed change gear shaft.

* * * * *